US012303444B2

(12) United States Patent
Zerhusen et al.

(10) Patent No.: US 12,303,444 B2
(45) Date of Patent: May 20, 2025

(54) PERSON SUPPORT APPARATUS HAVING EXERCISE THERAPY FEATURES

(71) Applicant: HILL-ROM SERVICES, INC., Batesville, IN (US)

(72) Inventors: Robert Mark Zerhusen, Cincinnati, OH (US); Neal Wiggermann, Batesville, IN (US)

(73) Assignee: HILL-ROM SERVICES, INC., Batesville, IN (US)

( * ) Notice: Subject to any disclaimer, the term of this patent is extended or adjusted under 35 U.S.C. 154(b) by 1145 days.

(21) Appl. No.: 17/061,925

(22) Filed: Oct. 2, 2020

(65) Prior Publication Data

US 2021/0106479 A1 Apr. 15, 2021

Related U.S. Application Data

(60) Provisional application No. 62/940,492, filed on Nov. 26, 2019, provisional application No. 62/912,932, filed on Oct. 9, 2019.

(51) Int. Cl.
*A63B 21/00* (2006.01)
*A61G 7/015* (2006.01)
(Continued)

(52) U.S. Cl.
CPC ........... *A61G 7/0536* (2013.01); *A61G 7/015* (2013.01); *A61G 7/018* (2013.01); *A61G 7/0573* (2013.01);
(Continued)

(58) Field of Classification Search
CPC ...... A61G 7/0536; A61G 7/015; A61G 7/018; A61G 7/0573; A61G 7/1021;
(Continued)

(56) References Cited

U.S. PATENT DOCUMENTS 2,057,811 A 10/1936 Armstrong
2,601,686 A 7/1952 Roessler
(Continued)

FOREIGN PATENT DOCUMENTS

CN 108 618 915 A 10/2018
CN 109 925 136 A 6/2019
(Continued)

OTHER PUBLICATIONS

Huangyuan. "HNYG 208Inch Medical Bed Restraints for Elderly, Patient Anti-Fall Restraints Bed Limb Holder, Hospital Bed Belt Restraining Strap for Dementia, Restless Syndrome, Psychopath." Amazon.com, Inc., Jun. 6, 2019. Web. Accessed Jul. 29, 2020. https://www.amazon.com/HUANGYUAN-Restraint-Prevent-Wheelchair-Anti-Fall/dp/B07SQ7Q3BQ. 6 pages.
(Continued)

*Primary Examiner* — Joshua Lee
*Assistant Examiner* — Catrina A Letterman
(74) *Attorney, Agent, or Firm* — Dinsmore & Shohl LLP

(57) ABSTRACT

A person support apparatus includes a support surface having a patient facing surface and includes a head section, a seat section, and a foot section, the head section and the foot section being rotatable with respect to the seat section. One or more actuators are provided to rotate the head section and the foot section with respect to the seat section. At least one strain gauge is provided proximate the patient facing surface of the support surface to detect a change in pressure against at least one of the head section and the foot section. A controller is configured to transmit a signal to one or more of the actuators to rotate a corresponding one of the head section or the foot section in response to receiving data from the at least one strain gauge indicating a change in pressure that exceeds a predetermined reduction in pressure.

10 Claims, 15 Drawing Sheets

(51) Int. Cl.
*A61G 7/018* (2006.01)
*A61G 7/053* (2006.01)
*A61G 7/057* (2006.01)
*A61G 7/10* (2006.01)

(52) U.S. Cl.
CPC ......... *A61G 7/1021* (2013.01); *A61G 7/1084* (2013.01); *A61G 7/1098* (2013.01); *A63B 21/151* (2013.01); *A63B 21/4034* (2015.10); *A63B 21/4035* (2015.10); *A61G 2203/20* (2013.01); *A61G 2203/32* (2013.01); *A63B 2208/0242* (2013.01)

(58) Field of Classification Search
CPC ................ A61G 7/1084; A61G 7/1098; A61G 2203/20; A61G 2203/32; A61G 7/05; A61G 2203/34; A63B 21/151; A63B 21/4034; A63B 21/4035; A63B 2208/0242; A63B 21/023; A63B 21/0428; A63B 21/055; A63B 2022/0094; A63B 2071/0063; A63B 2071/0625; A63B 2071/063; A63B 2208/0233; A63B 2208/0238; A63B 2208/0247; A63B 2208/0252; A63B 2220/17; A63B 21/00178; A63B 21/0085; A63B 21/0552; A63B 21/4009; A63B 21/4011; A63B 21/4045; A63B 22/0087; A63B 23/0211; A63B 24/0087; A63B 2209/08; A63B 2220/51; A63B 2220/56; A63B 2220/80; A63B 2220/833; A63B 2225/09; A63B 2225/093; A63B 2225/20; A63B 2225/50; A63B 2225/62; A63B 21/1672; A63B 71/0622; A61H 2201/0142; A61H 2201/1238; A61H 1/001; A61H 1/005; A61H 2201/1261; A61H 2201/163; A61H 2201/1642; A61H 2201/5007; A61H 2201/5023; A61H 2201/5061; A61H 2201/5071; A61H 2203/0437; A61H 2203/0443; A61H 2203/045; A61H 2203/0456; A61H 1/0237; A61H 1/024; A61H 2201/5097
See application file for complete search history.

(56) References Cited

U.S. PATENT DOCUMENTS

| | | | |
|---|---|---|---|
| 3,615,092 A | 10/1971 | Stubbmann | |
| 4,132,229 A | 1/1979 | Morrison | |
| 4,742,821 A | 5/1988 | Wootan | |
| 4,867,140 A | 9/1989 | Hovis et al. | |
| 4,908,889 A | 3/1990 | Lonardo | |
| 5,012,539 A | 5/1991 | Grigg | |
| 5,338,276 A | 8/1994 | Jull et al. | |
| 6,228,004 B1 | 5/2001 | Steinbach et al. | |
| 6,238,322 B1 | 5/2001 | Hsu | |
| 6,270,445 B1 | 8/2001 | Dean, Jr. et al. | |
| 6,336,235 B1 | 1/2002 | Ruehl | |
| 6,739,005 B2 | 5/2004 | Davis | |
| 6,772,764 B2 | 8/2004 | Chapman | |
| 7,017,208 B2 | 3/2006 | Weismiller et al. | |
| 8,025,617 B2 | 9/2011 | Tennant et al. | |
| 8,105,209 B2 | 1/2012 | Lannon et al. | |
| 8,262,543 B1 | 9/2012 | Batca | |
| 8,322,343 B2 | 12/2012 | Cardin | |
| 8,430,800 B2 | 4/2013 | Nolan et al. | |
| 8,491,446 B2 | 7/2013 | Hinds et al. | |
| 8,858,409 B2 | 10/2014 | Trees | |
| 8,950,026 B2 * | 2/2015 | Valdemoros Tobia | A61B 5/447 5/613 |
| 9,125,785 B2 | 9/2015 | Trees | |
| 9,295,422 B2 | 3/2016 | Tai | |
| 9,387,401 B2 * | 7/2016 | Knutsson | A63F 13/573 |
| 9,687,401 B2 | 6/2017 | Alford et al. | |
| 10,188,567 B2 | 1/2019 | Wurdeman | |
| 2004/0209750 A1 | 10/2004 | Parmater | |
| 2007/0238592 A1 | 10/2007 | Yu | |
| 2009/0062074 A1 * | 3/2009 | Vick, Jr. | A63B 21/4047 482/8 |
| 2010/0323861 A1 * | 12/2010 | Karwan | A47C 7/54 482/145 |
| 2012/0089419 A1 * | 4/2012 | Huster | A61G 7/015 705/3 |
| 2012/0102647 A1 * | 5/2012 | Weismiller | A61G 7/0509 5/624 |
| 2013/0205501 A1 | 8/2013 | Robertson et al. | |
| 2015/0290061 A1 * | 10/2015 | Stafford | A63B 22/0089 5/600 |
| 2017/0232293 A1 | 8/2017 | Deen | |
| 2017/0259109 A1 | 9/2017 | McJames, II | |

FOREIGN PATENT DOCUMENTS

| | | | |
|---|---|---|---|
| DE | 10 2012 016767 | A1 | 2/2014 |
| EP | 1 180 352 | A1 | 2/2002 |
| IT | RA20 120 026 | A1 | 6/2014 |
| WO | 2014078667 | A1 | 5/2014 |
| WO | 2019030423 | A2 | 2/2019 |

OTHER PUBLICATIONS

QMJHL. "QMJHL Bed guardrail Belt, Fall Protection Belt, Medical Belt, Bed or Chair Limb Belt, Orange, Blue, Black." Amazon.com, Inc. Web. Accessed Jul. 29, 2020. https://www.amazon.com/QMJHL-guardrail-Protection-Medical-Orange/dp/B07SGWL37D/ref=sr_1_3?dchild=1&keywords=guardrail+restraint+protection+medical&qid=1600947066&sr=8-3. 6 pages.

Extended European Search Report for Application No. 20200085.7-1113/3815663, dated Jul. 8, 2021, 13 pages.

Extended European Search Report for Appln. No. 24173193.4-1113 / 4382085, completed Sep. 3, 2024, 8 pages.

* cited by examiner

PERSON SUPPORT APPARATUS HAVING EXERCISE THERAPY FEATURES

CROSS-REFERENCE TO RELATED APPLICATIONS

This application is a non-provisional application and claims priority to U.S. Provisional Patent Application No. 62/912,932, filed Oct. 9, 2019, entitled "Person Support Apparatus Having Exercise Therapy Features" and U.S. Provisional Patent Application No. 62/940,492, filed Nov. 26, 2019, entitled "Person Support Apparatus Having Exercise Therapy Features," both of which are hereby incorporated by reference in their respective entireties including the drawings.

TECHNICAL FIELD

The present specification generally relates to person support apparatuses and, more particularly, to person support apparatuses having exercise therapy features.

BACKGROUND

Long periods of bed rest that are sometimes necessary for recovery of subjects often lead to deterioration of muscle strength and a corresponding inability of the subject to support his or her full body weight upon standing. It can be challenging for rehabilitation specialists to help these subjects regain the ability to stand and begin ambulation, and the challenge is especially great for obese subjects. A common technique in conventional practice is to summon as many personnel as practical to lift and maneuver the weakened subject to a standing position while he or she attempts to bear full weight through the lower extremities. This technique is not only dangerous, because of the risk of a fall, but it is also psychologically degrading for the subject as the activity reinforces the subject's dependence on others.

Hospital beds have evolved over the years from conventional beds that lie flat to beds that convert into a chair position, allowing subjects to begin standing from a sitting position at the foot of the bed. However, the sitting position does not improve a subject's leg strength and does little for preparing a subject for upright standing. Subjects are still required to be lifted by hospital staff as the subject's leg muscles do not have adequate strength to support his or her weight. Additionally, these beds typically do not include various exercise devices incorporated into the bed for allowing the subject to perform exercises to strengthen their muscles while in the bed. As such, this requires separate devices to be brought to the bed so that the exercises may be performed. However, these devices may not be specifically configured for the bed and, thus, may not be appropriately fitted to the bed or, at a minimum, require installation and setup.

SUMMARY

In one aspect, a person support apparatus includes a support surface having a patient facing surface and includes a head section, a seat section, and a foot section, the head section and the foot section being rotatable with respect to the seat section. A head section actuator is coupled between the head section and the seat section to rotate the head section with respect to the seat section. A foot section actuator is coupled between the foot section and the seat section to rotate the foot section with respect to the seat section. At least one strain gauge is provided proximate the patient facing surface of the support surface to detect a change in pressure against at least one of the head section and the foot section. A controller is configured to transmit a signal to one or more of the head section actuator or the foot section actuator to rotate a corresponding one of the head section or the foot section in response to receiving data from the at least one strain gauge indicating a change in pressure that exceeds a predetermined reduction in pressure.

In another aspect, a person support apparatus includes a base frame, an upper frame, and a plurality of lift members extending between the base frame and the upper frame for moving the upper frame with respect to the base frame. The person support apparatus further includes a support surface having a patient facing surface and includes a head section, a seat section, and a foot section, the head section and the foot section being rotatable with respect to the seat section. One or more actuators are coupled between one or more of the head section and the seat section to rotate a corresponding one of the head section and the foot section with respect to the seat section. At least one strain gauge is provided proximate the patient facing surface of the support surface to detect a change in pressure against at least one of the head section and the foot section. A controller is configured to transmit a signal to the one or more actuators to rotate a corresponding one of the head section and the foot section in response to receiving data from the at least one strain gauge indicating a change in pressure that exceeds a predetermined reduction in pressure.

In yet another aspect, a method for performing exercises in a person support apparatus includes receiving, at a user interface, a maximum angle of rotation and a predetermined reduction in pressure, monitoring, by a strain gauge, a change in pressure applied against a head section of the person support apparatus, and responsive to a change in pressure against the head section detected by the strain gauge exceeding the predetermined reduction in pressure, rotating the head section in a first direction with respect to a seat section of the person support apparatus toward the maximum angle of rotation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure generally relates to person support apparatuses including various systems and components for use in allowing a subject to perform various muscle strengthening exercises, muscle stretching exercises, rehabilitation exercises, as well as other potential uses which are contemplated herein. The person support apparatus depicted in FIGS. 1-3 include a base frame, a plurality of lift members coupled to the base frame, and an upper frame movably supported by the plurality of lift members above the base frame. In some embodiments, the person support apparatus includes a rotatable head section that assists a subject in performing sit up exercises. In some embodiments, the person support apparatus includes a rotatable foot section that assists a subject in performing leg raise and leg curl exercises. In some embodiments, the person support apparatus includes at least one inflatable bladder for performing knee flexion exercises. Additionally, various accessories and straps may be utilized to assist in performing other upper body and lower body exercises while on the person support apparatus. Various embodiments of the person support apparatus and methods for performing exercises will be described in more detail herein with specific reference to the appended drawings.

Person Support Apparatus

Figure 1:
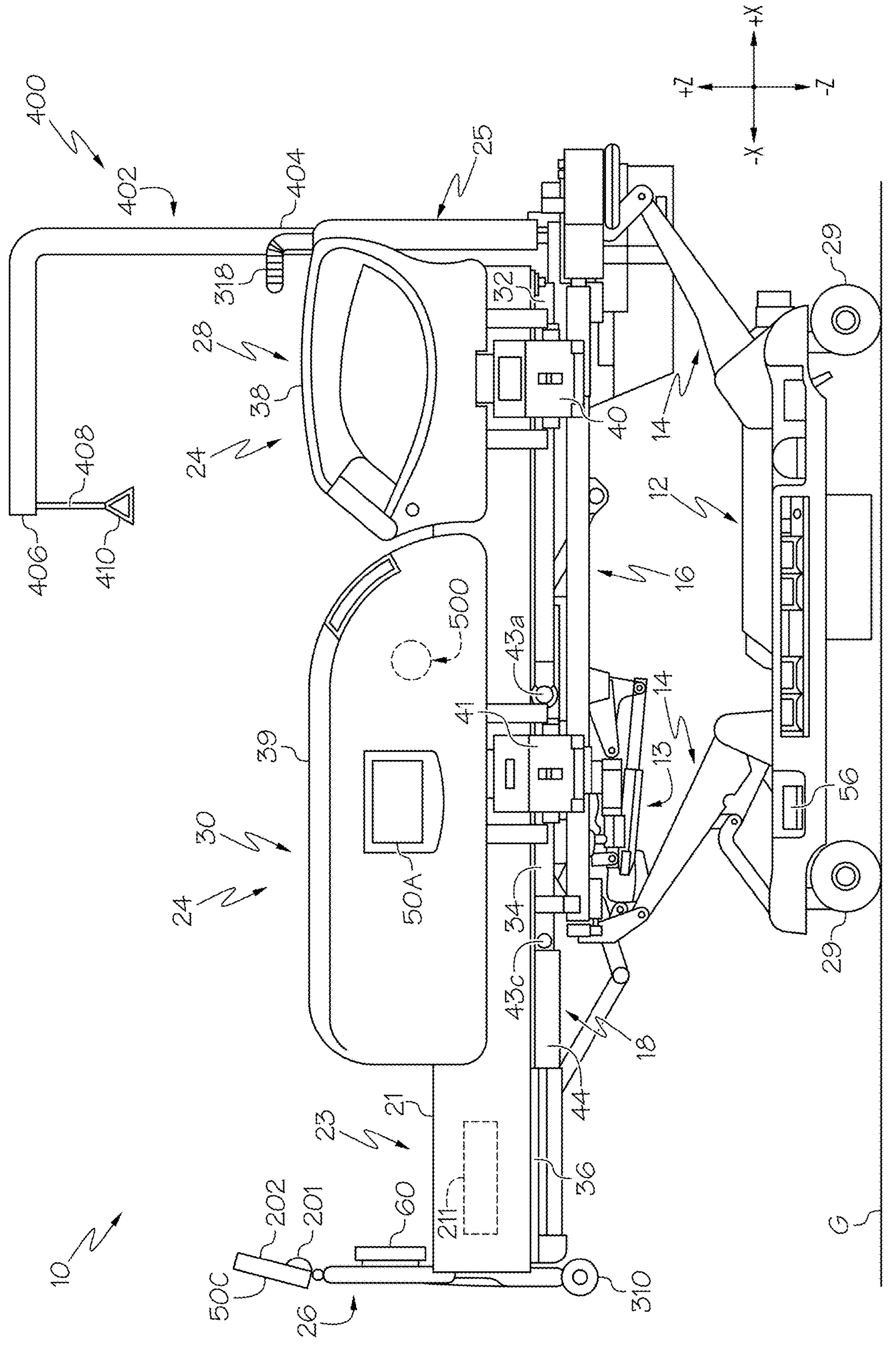
FIG. 1 schematically depicts a side view of an illustrative person support apparatus, according to one or more embodiments shown and described herein.
Figure 2:
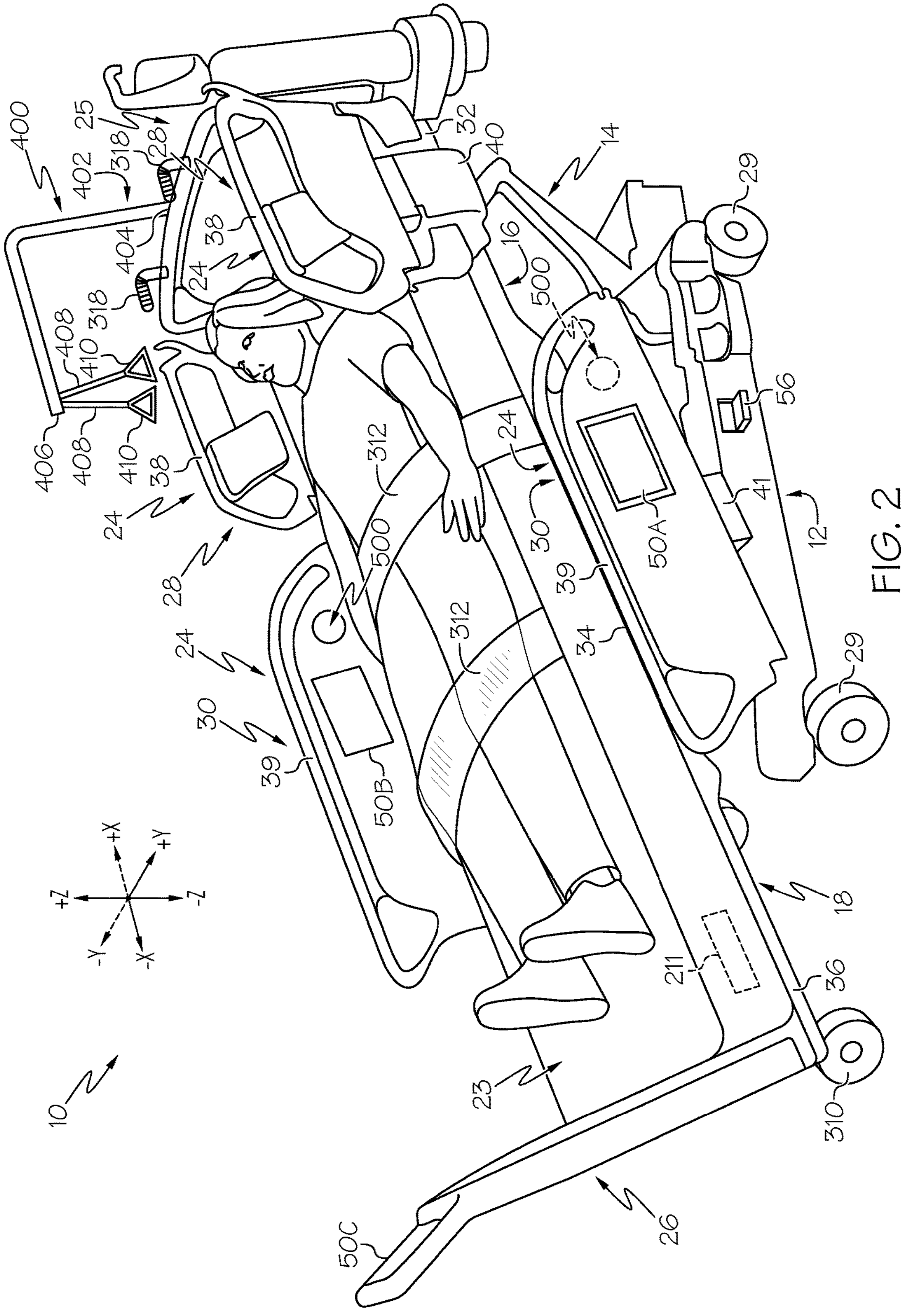
FIG. 2 schematically depicts a perspective view of the person support apparatus of FIG. 1, including an upper frame in a partially inclined position and supporting a subject thereon, according to one or more embodiments shown and described herein.
Figure 3:
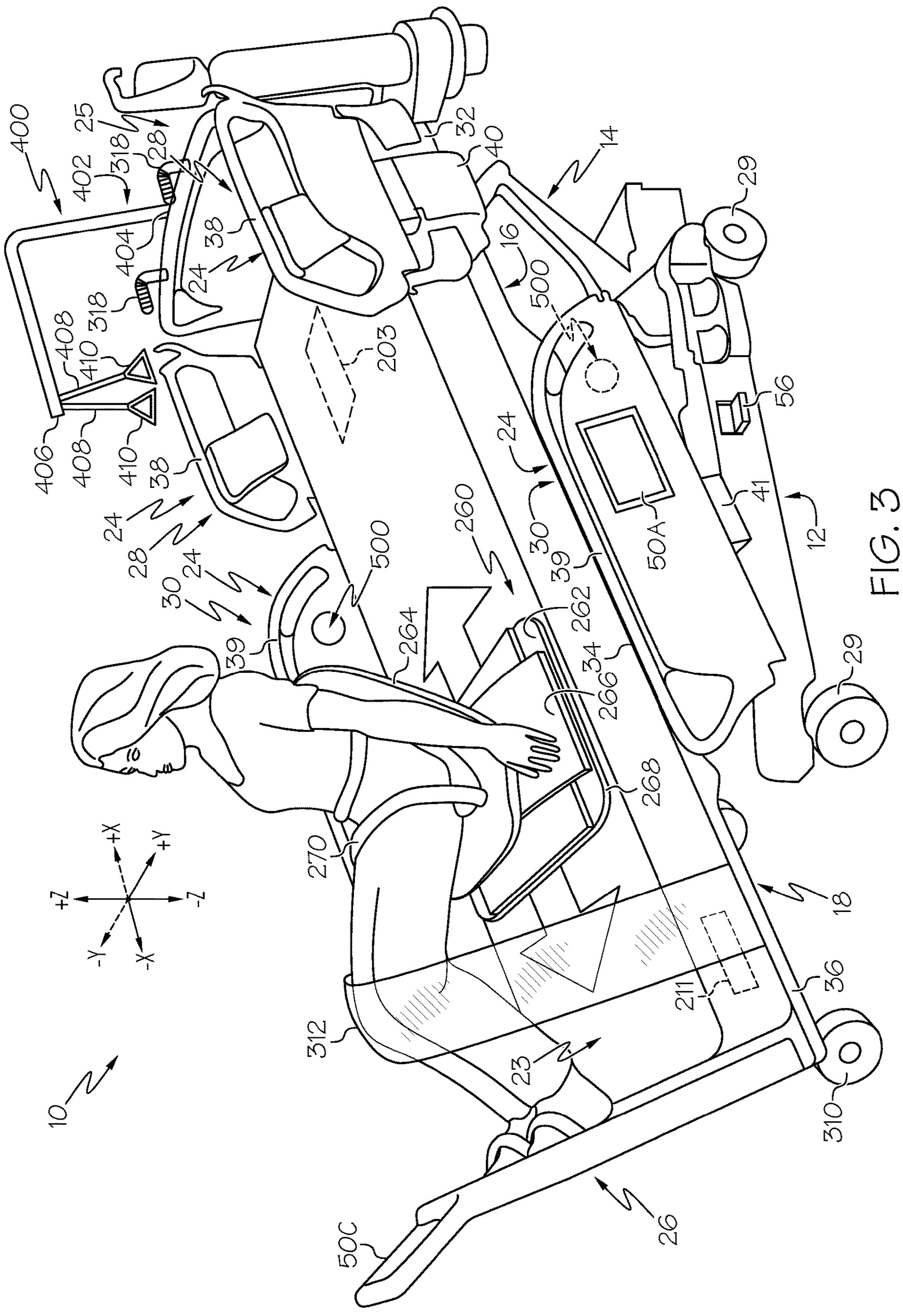
FIG. 3 schematically depicts a perspective view of the person support apparatus of FIG. 1 having a movable seat accessory that is usable by a subject, according to one or more embodiments shown and described herein.

Referring now to FIGS. 1-3, a person support apparatus 10 according to various embodiments is depicted. The person support apparatus 10 can be, for example, a hospital bed, a stretcher, a subject lift, a chair, an operating table, or similar support apparatuses commonly found in hospitals, nursing homes, rehabilitation centers or the like. As shown in FIG. 1, the person support apparatus 10 includes a base frame 12 including a plurality of wheels or casters 29 that are movable along a ground surface G. A plurality of lift members 14 extend from the base frame 12 and support an upper frame 16 above the base frame 12. A first end lift member 14 is coupled to the base frame 12 and an opposite end of each lift member 14 is coupled to the upper frame 16. Thus, the upper frame 16 is supported by the plurality of lift members 14 above the base frame 12 such that the upper frame 16 is movable relative to the base frame 12. In embodiments, the ends of the lift members 14 may be rotatably attached to the base frame 12 and the upper frame 16 to allow the ends of the lift members 14 to rotate relative to the base frame 12 and the upper frame 16 as the upper frame 16 is raised. In various embodiments, the person support apparatus 10 includes a support surface 18 supported by the upper frame 16. The support surface 18 supports a mattress 23 thereon. The support surface 18 has a head section 32, a seat section 34, and a foot section 36, with the seat section 34 located between the head section 32 and the foot section 36. As discussed herein, the head section 32 and the foot section 36 are rotatable relative to the seat section 34 and, in some embodiments, each of the head section 32, the seat section 34, and the foot section 36 are movable relative to the upper frame 16. As such, the head section 32 rotates between a horizontal position, in which the head section 32 is substantially parallel to the seat section 34, and a vertical position, in which the head section 32 is substantially perpendicular to the seat section 34. The foot section 36 also rotates between a horizontal position, in which the foot section 36 is substantially parallel to the seat section 34, and a vertical position, in which the foot section 36 is substantially perpendicular to the seat section 34. As discussed in more detail herein, one or more strain gauges 203, as shown in FIG. 3, may be positioned in or on one of the mattress 23 or the head section 32 of the support surface 18 for detecting a force applied against the head section 32 of the support surface 18. Similarly, one or more strain gauges 211 may also be positioned in or on one of the mattress 23 or the foot section 36 of the support surface 18 for detecting a force applied against the foot section 36 of the support surface 18. When the strain gauges 203, 211 are positioned in the support surface 18, the strain gauges 203, 211 are located proximate a subject facing surface 21 of the support surface 18. The strain gauges 203, 211 may be any suitable sensor for converting a force applied against the strain gauge 203, 211 into a change in electrical resistance which can then be measured.

As used herein, "upper" and "above" are defined as the +Z direction of the coordinate axes shown in the drawings. "Lower" and "below" are defined as the −Z direction of the coordinate axes shown in the drawings. Similarly, it should be appreciated that when referring to the upper frame 16 being "raised," the upper frame 16 is moving in the +Z direction of the coordinate axes shown in the drawings. Similarly, when the upper frame 16 is being "lowered," the upper frame 16 is moving in the −Z direction of the coordinate axes shown in the drawings.

In embodiments, the lift members 14 include various linear actuators 13 (such as jack motors and the like) and related mechanical and electrical components extending between the upper frame 16 and the lift members 14 to facilitate extension of the lift members 14 and raising, lowering, and tilting of the upper frame 16, and thus the support surface 18, with respect to the base frame 12. In other embodiments, the various linear actuators 13 may be provided entirely on the lifting members 14 to facilitate extension of the lift members 14. Tilting of the support surface 18 relative to the base frame 12 may also be referred to herein as orienting the support surface 18 in a Trendelenburg orientation or a reverse Trendelenburg orientation. In a Trendelenburg orientation, the head section 32 of the support surface 18 is lower than the foot section 36 of the support surface 18 along the +/−Z axis depicted in the coordinate axes of the drawings. In other words, the head section 32 is closer to the ground surface G than the foot section 36 when in the Trendelenburg orientation. In a reverse Trendelenburg orientation, the foot section 36 of the support surface 18 is lower than the head section 32 of the support surface 18 such that the foot section 36 is closer to the ground surface G than the head section 32.

Figure 7:
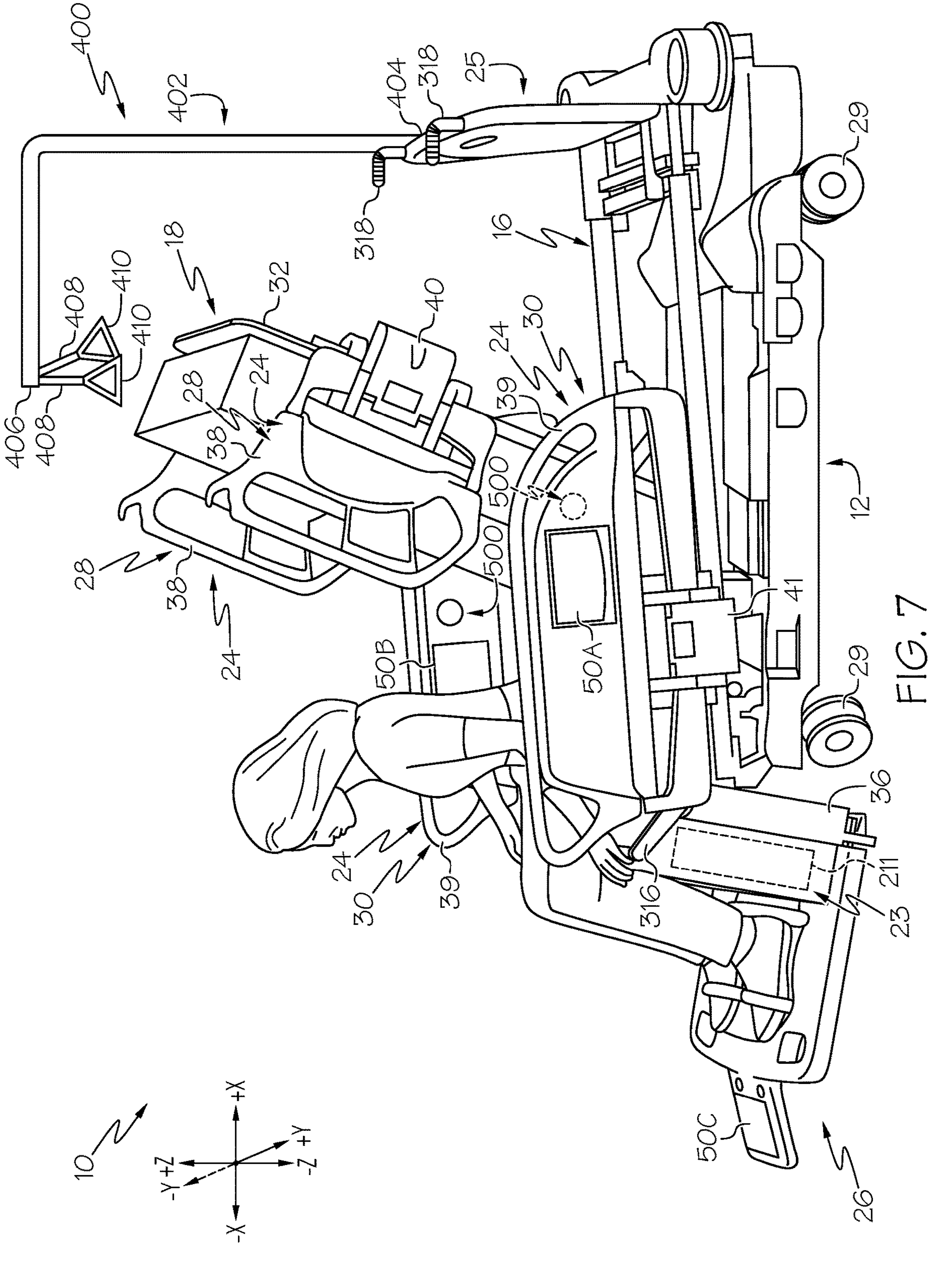
FIG. 7 schematically depicts a perspective view of the person support apparatus of FIGS. 1-3 in a sitting configuration with the head section in the fully inclined position and a foot section in a fully lowered position and supporting a subject thereon, according to one or more embodiments shown and described herein.

At noted above, the head section 32 and the foot section 36 are each movable relative to the seat section 34, which may also be movable relative to the upper frame 16. For example, the head section 32 and the foot section 36 rotate to raise and lower between the respective horizontal positions and the vertical positions relative to the seat section 34. The mattress 23 is flexible such that it can be articulated along with the support surface 18. In some embodiments, the person support apparatus 10 includes one or more actuators or motors such as a head section actuator 43*a*, a seat section actuator 43*b*, and a foot section actuator 43*c* (FIG. 4), which, in some embodiments, include linear actuators with electric motors to move the head section 32, the seat section 34, and the foot section 36, respectively. It should be appreciated that these actuators 43*a*, 43*b*, 43*c* that operate the head section 32, the seat section 34, and the foot section 36 may be separate and distinct from the actuators that form the lift members 14 provided between the base frame 12 and the upper frame 16 for moving the upper frame 16 relative to the base frame 12. Further, the actuators 43*a*, 43*b*, 43*c* operate to adjust the position of the support surface 18 with respect to the base frame 12 greater than that provided by the lift members 14 alone. Specifically, as shown in FIG. 1, the head section actuator 43*a* may be provided between the head section 32 and the seat section 34 to facilitate rotation of the head section 32 relative to the seat section 34. Also shown in FIG. 1, the foot section actuator 43*c* may be provided between the foot section 36 and the seat section 34 to facilitate rotation of the foot section 36 relative to the seat section 34. The actuators 43*a*, 43*b*, 43*c* are well-known in the hospital bed art and, thus, are not described in more detail herein. Alternative actuators or motors contemplated by this disclosure include hydraulic cylinders and pneumatic cylinders, for example. In the illustrative embodiment, the orientation of the seat section 34 may be fixed relative to the upper frame 16 as the support surface 18 moves between its various subject supporting positions including a horizontal position in which the head section 32 and the foot section 36 are both in the horizontal position, as shown in FIG. 1, to support the subject in a supine position, and a chair position in which the head section 32 and the foot section 36 are both in the vertical position, as shown in FIG. 7, to support the subject in a sitting up position.

In some embodiments, the foot section 36 is movable between an extended position and a retracted position with respect to the seat section 34. For example, a linear actuator 44 may be coupled to the foot section 36 to enable the length of the person support apparatus 10, particularly the support surface 18, to be adjusted. For example, the foot section 36, when extendable, may be retracted to decrease the length of the person support apparatus 10, and may be extended to increase the length of the person support apparatus 10. In embodiments, automatic (i.e., active) extension and retraction of the foot section 36 may be accomplished in response to actuation of the linear actuator 44, which may automatically extend and retract the foot section 36 in response to signals received from a control unit. In embodiments, the foot section 36 may also be slidable with respect to the upper frame 16 such that the linear actuator 44 provides a passive assist in facilitating leg presses. As such, linear actuator 44 slides the foot section 36 away from the seat section 34 in response to receiving a force, such as a subject pressing against the foot section 36.

The person support apparatus 10 may further include side rails 24, a headboard 25, and a footboard 26. The headboard 25 may be coupled to the upper frame 16 proximate the head section 32 of the support surface 18. The side rails 24 and the footboard 26 may be coupled to the support surface 18, with the footboard 26 at an end of the foot section 36 and the side rails 24 located between the headboard 25 and the footboard 26.

In some embodiments, the side rails 24 may include a plurality of sections. For example, the side rails 24 may each include a head side rail 28 positioned at the head section 32 of the support surface 18, and an intermediate side rail 30 positioned at the seat section 34 of the support surface 18 between the head side rail 28 and the foot section 36. The head side rail 28 includes a head side rail body 38 and a head side rail movement assembly 40. The head side rail movement assembly 40 movably couples the head side rail body 38 to the head section 32 of the support surface 18 and permits movement of the head side rail 28 between a deployed position and a stowed position. When the head side rail 28 is in the deployed position, at least a portion of the head side rail body 38 is positioned above the support surface 18. When the head side rail 28 is in the stowed position, the head side rail body 38 is positioned below at least the mattress 23. In embodiments, the head side rail body 38 may also be positioned below the support surface 18 when in the stowed position. In some embodiments, the head side rail movement assembly 40 includes a locking mechanism (not shown) that maintains the head side rail 28 in the deployed position and/or the stowed position.

The intermediate side rail 30 includes an intermediate side rail body 39 and an intermediate side rail movement assembly 41. The intermediate side rail movement assembly 41 movably couples the intermediate side rail body 39 to the seat section 34 of the support surface 18 and permits movement of the intermediate side rail 30 between a deployed position and a stowed position, as shown in FIG. 3. When the intermediate side rail 30 is in the deployed position, at least a portion of the intermediate side rail 30 is positioned above the support surface 18. When the intermediate side rail 30 is in the stowed position, the intermediate side rail body 39 is positioned below at least the mattress 23. In embodiments, the intermediate side rail 30 may also be positioned below the support surface 18 when in the stowed position. In some embodiments, the intermediate side rail movement assembly 41 includes a locking mechanism (not shown) that maintains the intermediate side rail 30 in the deployed position and/or the stowed position.

The person support apparatus 10 further includes at least one exterior user interface 50A located on an outer surface of one of the intermediate side rails 30, at least one interior user interface 50B located on the opposite inner or mattress facing surface of one of the intermediate side rails 30, and at least one foot user interface 50C located on a mattress facing surface of the footboard 26. The exterior user interface 50A, the interior user interface 50B, and the foot user interface 50C may be referred to generally herein as user interfaces 50. It should be understood that the user interfaces 50 may be located elsewhere on the person support apparatus 10. The user interfaces 50 may each be configured for control and/or display of the features of the person support apparatus 10. As such, each of the user interfaces 50 includes user interface hardware components such as, for example, buttons, joysticks, touchscreens, and other suitable user controls for operating the user interfaces 50 and, thus, the person support apparatus 10.

As noted hereinabove, the user interfaces 50 may be in the form of or include a display 202. The display 202 may be a touchscreen, LCD screen, or other suitable display. In addition, the user interfaces 50 display information about a subject's use of the pressure surface 60 for therapeutic strength training and/or monitoring. For example, the user interfaces 50 can display the number of applications of force to the pressure surface 60, the length of time that the pressure surface 60 was used by the subject, a stroke length, a percent of completion of an exercise or therapy routine, and/or the amount of force that the subject applied to the pressure surface 60. Additionally, the user interfaces 50 may display historical trends indicative of changes over time, for example, by hour, by day, or by week. Moreover, the user interfaces 50, particularly the interior user interface 50B and/or the foot user interface 50C, may display words of encouragement regarding the use of the pressure surface 60 (e.g., "Keep It Up", "Almost Done", "Just One More", "You Can Do It", "Great Job", etc.) In some embodiments, the user interfaces 50 may include a speaker 201. The speaker 201 can be used for providing audible signaling to a subject positioned in the person support apparatus 10. For example, in one embodiment, the user interfaces 50 may play audible words of encouragement through the speaker 201. In other embodiments, the user interfaces 50 may give audible indicators related to exercise progress to a subject.

In some embodiments, the person support apparatus 10 includes a subject helper system 400 for facilitating pull down stretches. The subject helper system 400 generally includes a tube 402 having a first end 404 and a second end 406. As shown, the first end 404 of the tube 402 is mounted to the headboard 25 and extends above and over the head section 32 of the support surface 18. However, the tube 402 may be coupled to the person support apparatus 10 proximate the first end 404 of the tube 402 at any other suitable location such as, for example, the base frame 12 or the upper frame 16. The subject helper system 400 includes at least one belt 408 extending through the tube 402 and out of the tube proximate the second end 406 of the tube 402. A pair of handles 410 is attached to an end of the belt 408 to facilitate gripping by the subject. The subject helper system 400 includes a tensioning assembly, as described in more detail herein, for providing resistance when performing exercises using the subject helper system 400.

As the person support apparatus 10 is positioned into a reverse Trendelenburg orientation, the foot section 36 of the support surface 18 may come into close contact with the ground surface G. Thus, in some embodiments, the person support apparatus 10 includes a support component 310 to further stabilize the person support apparatus 10 and prevent the footboard 26 from being damaged upon contact with the ground surface G. In some embodiments, the support component 310 is provided on a lower edge of the footboard 26 at a medial location of the footboard 26 along the +/− Y axis of the coordinate axes depicted in the drawings to prevent the footboard 26 from directly contacting the ground surface G when the foot section 36 is rotated to the vertical position or the person support apparatus 10 is in the reverse Trendelenburg orientation. In other embodiments, the support component 310 is provided on a lower surface of the upper frame 16 to prevent the upper frame 16 from contacting the ground surface G in instances in which the footboard 26 is removed or in a retracted position in which the upper frame 16 would contact the ground surface G prior to the footboard 26. In some embodiments, the support component 310 is a support caster similar to casters 29. Although only a single support component 310 is illustrated, a plurality of support components 310 may be provided on the lower edge of the footboard 26.

In some embodiments, as shown in FIG. 2, the person support apparatus 10 includes at least one restraint strap 312. As shown, the person support apparatus 10 includes a pair of restraint straps 312 with one of the restraint straps 312 positioned proximate a torso of the subject and the other of the restraint straps 312 positioned proximate the knees of the subject. Specifically, one of the restraint straps 312 is provided proximate a location of the mattress 23 where the seat section 34 meets the foot section 36 as this is where the subject's knees will be located. Additionally, the other one of the restraint straps 312 is provided proximate a location of the mattress 23 where the seat section 34 meets the head section 32 as this is where the subject's waist will be located. Each restraint strap 312 is secured at opposite ends thereof to the person support apparatus 10. In some embodiments, opposite ends of the restraint strap 312 are secured to adjacent sides or an underside surface of the mattress 23. In other embodiments, opposite ends of the restraint strap 312 are secured to adjacent sides of the support surface 18, an upper surface of the support surface 18 facing the mattress 23, or a lower surface of the support surface 18 facing the upper frame 16. It is to be understood that opposite ends of the restraint strap 312 may be secured using any suitable means, such as mechanical fasteners. As such, each end of the restraint strap 312 may be removably attachable to the mattress 23 or the support surface 18 by detaching the mechanical fasteners or other securing mechanism. This allows for the restraint strap 312 to be moved between the different positions shown in FIG. 2 to be located at either the torso or the knees of the subject. Permitting the restraint strap 312 to be detached from the person support apparatus 10 also allows for different restraint straps having varying sizes to be used, for the restraint strap 312 to be removed when not necessary, or for attaching multiple restraint straps 312 to the person support apparatus 10, particularly one located at the knees of the subject and one located at the waist of the subject.

Alternatively, the ends of the restraint strap 312 may be permanently fixed to the mattress 23 by being sewn thereto. When the restraint strap 312 is positioned at the subject's knees, the restraint strap 312 has a length defined by a distance between opposite ends of the restraint strap 312. To provide the correct length for the restraint strap 312, the subject may attach a particular restraint strap 312 that is appropriate for the size and needs of the subject. Alternatively, in some embodiments, the length of the restraint strap 312 itself may be adjustable. The length of the restraint strap 312 may be adjusted by reattaching one or both ends of the restraint strap 312 to the person support apparatus 10 at different positions along the restraint strap 312 or adjusting a mechanism, such as a buckle, to increase or decrease the length of the restraint strap 312. In embodiments, the restraint strap 312 has an elasticity to allow a subject to perform shallow knee bends and restrict the subject from over bending at the knee. In some embodiments, the restraint strap 312 is formed from an inelastic material to prevent stretching as the subject performs the shallow knee bend. In other embodiments, the restraint strap 312 is formed from an elastic material to permit limited stretching while preventing overextending of the subject's knees.

As shown in FIG. 3, in some embodiments, the person support apparatus 10 includes an exercise pad 260 for facilitating shallow knee bends and allowing the subject to move atop the mattress 23 along the +/−X axis of the coordinate axes depicted in the drawings. The exercise pad 260 may be used in combination with the restraint strap 312, which is shown in transparency and attached to the mattress 23. Thus, the exercise pad 260 is positioned on the mattress 23 proximate the seat section 34 and/or the foot section 36 based on a degree of bending in the subject's knees. The exercise pad 260 has a width extending along the +/−Y axis of the coordinate axes depicted in the drawings. The width of the exercise pad 260 is equal to or less than a width of the mattress 23 such that the exercise pad 260 does not interfere with the side rails 24 when the exercise pad 260 moves along the mattress 23.

In this embodiment, the exercise pad 260 includes a base 262 and a seat 264 affixed to an upper surface 266 of the base 262. A bottom surface 268 of the base 262, opposite the upper surface 266, is formed from a low friction material such as, for example, nylon, satin, silk, and the like, to easily allow the exercise pad 260 to slide across the mattress 23. The seat 264 may include a foam body for providing comfort to the subject while sitting on the seat 264. As shown, opposite ends of at least one strap 270 may be attachable to the seat 264 to secure the subject to the exercise pad 260. However, in some embodiments, the strap 270 may extend from the base 262. It is to be understood that the exercise pad 260 is an accessory device that may be easily removable from the person support apparatus 10 such that the person support apparatus 10 can be used for any of the other exercises described herein without being limited to being used with the exercise pad 260.

In other embodiments, the exercise pad 260 may include only one of the base 262 or the seat 264. When only the base 262 is provided, the subject sits on the upper surface 266 of the base 262 and slides along the mattress 23. Alternatively, when only the seat 264 is provided, the seat 264 itself slides along the mattress 23 instead of the base 262.

Electronic Control Unit

Figure 4:
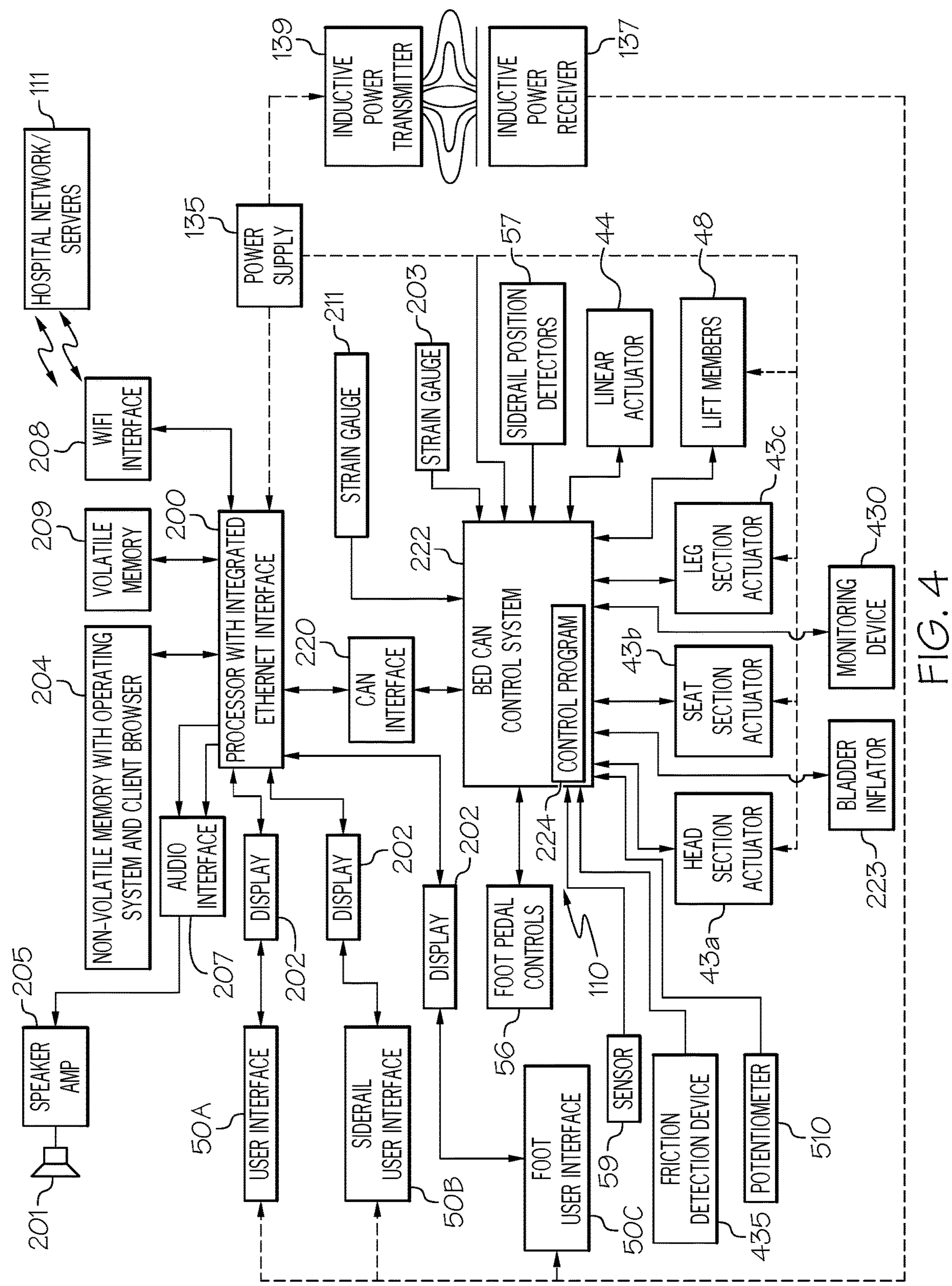
FIG. 4 schematically depicts a block diagram of an illustrative electronic control system of a person support apparatus providing control of various features, according to one or more embodiments shown and described herein.

FIG. 4 is a block diagram of an embodiment of an electronic control system 110 that provides control of various functions of the person support apparatus 10 described herein. In embodiments including an extendible foot section 36, the electronic control system 110 operates and monitors the linear actuator 44 to extend and retract the extendible foot section 36. The electronic control system 110 may further operate and monitor the lift members 14 to move the upper frame 16 relative to the base frame 12. Foot pedal controls 56 may be provided on the base frame 12, as shown in FIG. 1, at any suitable location for an operator to depress with his or her foot. The foot pedal controls 56, when provided, are communicatively coupled to the lift members 14 and/or the linear actuators 13 for operating the lift members 14 and raising and lowering the upper frame 16 relative to the base frame 12. In various embodiments, the electronic control system 110 further operates and monitors the head section actuator 43*a*, the seat section actuator 43*b*, and the foot section actuator 43*c* to pivot the head section 32, the seat section 34, and the foot section 36, respectively, relative to the upper frame 16.

In embodiments, the foot user interface 50C may be communicatively coupled to a pressure surface 60 which is mounted to the footboard 26 of the person support apparatus 10. The pressure surface 60 may include a sensor 59, such as a flexing force pressure sensor, which measures the amount of force applied to the sensor 59. The sensor 59 may be, for example, an integrated load cell sensor such as those that measure weight. However, other force-sensing technologies may be utilized, such as pressure-sensitive resistors, capacitive force sensors, and piezoelectric transducers, for example.

In various embodiments, a subject positioned on the person support apparatus 10 can push upon the pressure surface 60 and the amount of force imparted to the pressure surface 60 is detected by the sensor 59. The resulting force, the number of applications of force (i.e., repetitions), and other data detected with the sensor 59 may be communicated to the foot user interface 50C, processed and/or displayed, as well as stored in memory of the electronic control system 110.

A controller area network system 222 may execute a control program 224 to control the various actuators and components. Such a system can include one or more controller area network (CAN) controller nodes to control the various actuators. If multiple controller nodes are utilized, the nodes can communicate with one another via serial bus connections. The control program 224 may further include additional control software or other logic that indicates desired control logic for the person support apparatus 10 such as, for example, to control which actuators to operate in response to which user inputs, what displays on the user interfaces 50 at what times, how to convert data from the sensor 59 into a subject's weight, and what alarms to sound via the speaker 201 and/or the user interfaces 50 in response to inputs (side rails up/down detected by side rail position detectors 57, brakes set/notset, bed low/notlow, person position). The control program 224 may be stored in the electronic control system 110, or may be stored remotely and accessed by the electronic control system 110 via a network connection.

A microprocessor 200 communicates with the controller area network system 222 via a CAN interface circuit 220.

Accordingly, the microprocessor 200 can receive inputs indicating the force provided by the person on the therapy mechanisms described herein, and allow for feedback to be provided to the subject during such therapy. The microprocessor 200 includes processing components operable to receive and execute machine-readable instructions, such as those stored in a non-volatile memory component 204 and/or a volatile memory component 209.

The CAN interface circuit 220 allows the microprocessor 200 to deliver input commands to the controller area network system 222 to perform a variety of functions, such as to move an actuator or set an alarm signal. The CAN interface circuit 220 further enables the controller area network system 222 to deliver actuator status information and other information to the microprocessor 200, which may be displayed on at least one of the user interfaces 50. The CAN interface circuit 220 includes appropriate circuitry or integrated circuitry that allows the microprocessor 200 to communicate with the controller area network system 222. The CAN interface circuit 220 may be, for example, a high speed CAN transceiver.

The microprocessor 200 communicates with and drives the display 202 of a corresponding one of the user interfaces 50. The display 202 includes appropriate driver or interface circuitry for driving displays. Additionally, the microprocessor 200 may drive a speaker amplifier 205, via an audio interface 207, to permit audio through the speaker 201. Accordingly, alarms, music, nature sounds and other sounds can be driven by the microprocessor 200 through the speaker 201 and/or the user interfaces 50.

The electronic control system 110 of the person support apparatus 10 may include a Wi-Fi interface 208. The Wi-Fi interface 208 allows the microprocessor 200 to communicate with a hospital server 111 (and/or to other equipment) via a wireless local area network communication protocol.

In some embodiments, the electronic control system 110 may further include a power supply 135. The power supply 135 may be, for example, a battery or connection to an alternating current power source. The power supply 135 may provide power to various components of the electronic control system 110. Additionally, the power supply 135 may provide power to an inductive power transmitter 139. The inductive power transmitter 139 can provide power to an inductive power receiver 137 incorporated into one or more features described herein. For example, an inductive power transmitter 139 may be supported by the upper frame 16, and an inductive power receiver 137 may be supported by the footboard 26. The inductive power transmitter 139 is connected with the power supply 135 and induces power in the inductive power receiver 137 to operate the foot user interface 50C of the footboard 26. Accordingly, a variety of footboards 26 having electronics may be attached to the person support apparatus 10, and interchanged therewith without need for physically plugging in the footboards 26 or having them connect directly with the electronic control system 110. Rather, the power to the footboard 26 may be provided wirelessly through the inductive power transmitter 139 and the inductive power receiver 137, and the footboard 26 may operate as a standalone module.

Other components or parts of the person support apparatus 10 may be powered by such power transmitter/receiver arrangements, such as the headboard 25, the side rails 24, the user interfaces 50, and the like. Examples of wireless power transmitters and receivers are those having transmit and receive coils respectively, such as those provided by Wurth Electronics and having Texas Instruments inductive transmitter and receiver manager integrated circuits.

Having described an exemplary person support apparatus in general, various features of the person support apparatus 10 including exercise therapy configurations in accordance with one or more embodiments and methods of using the person support apparatus 10 will now be described.

Handles

Figure 5:
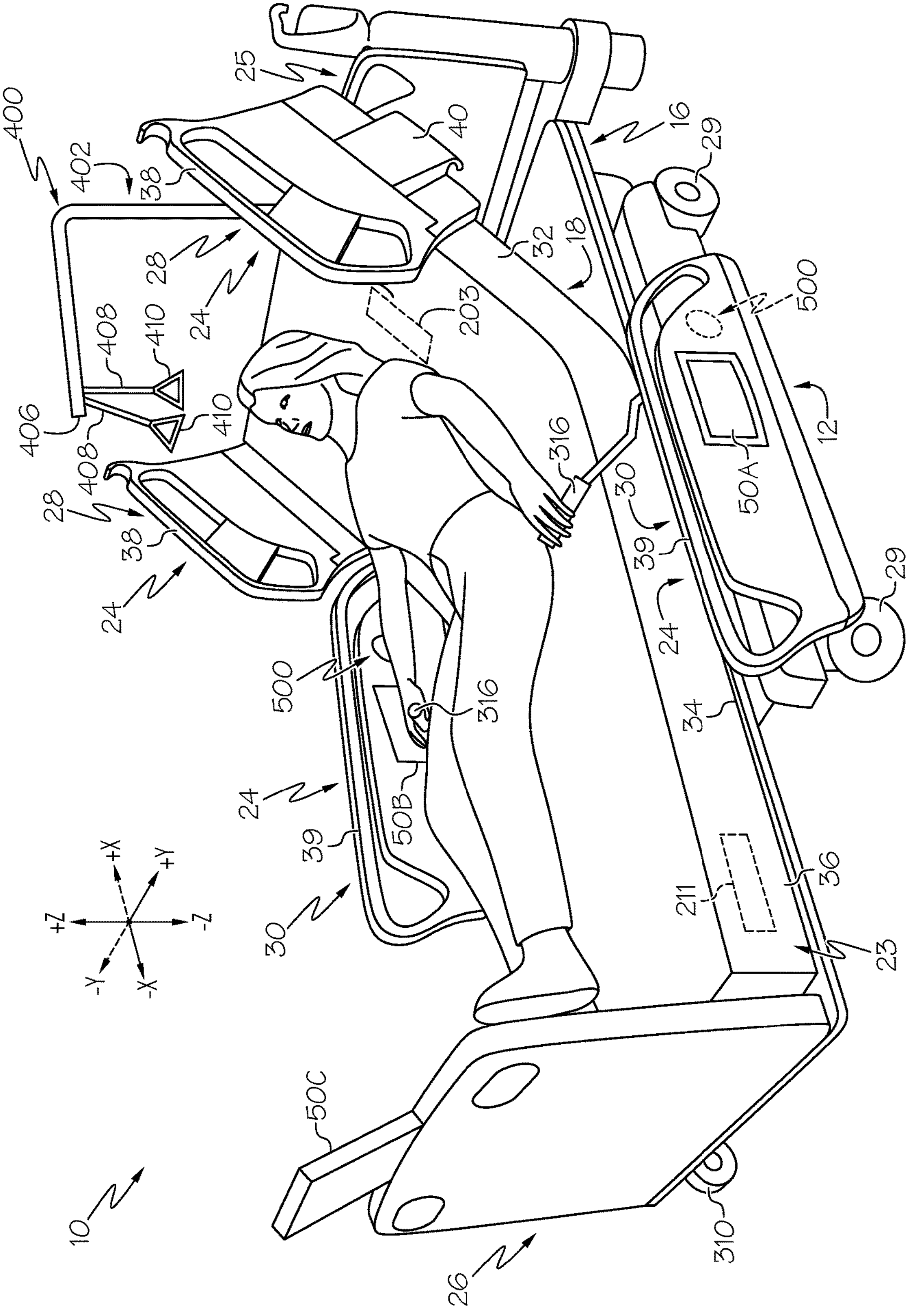
FIG. 5 schematically depicts a perspective view of the person support apparatus of FIGS. 1-3 including a head section in a partially inclined position and supporting a subject thereon, according to one or more embodiments shown and described herein.
Figure 6:
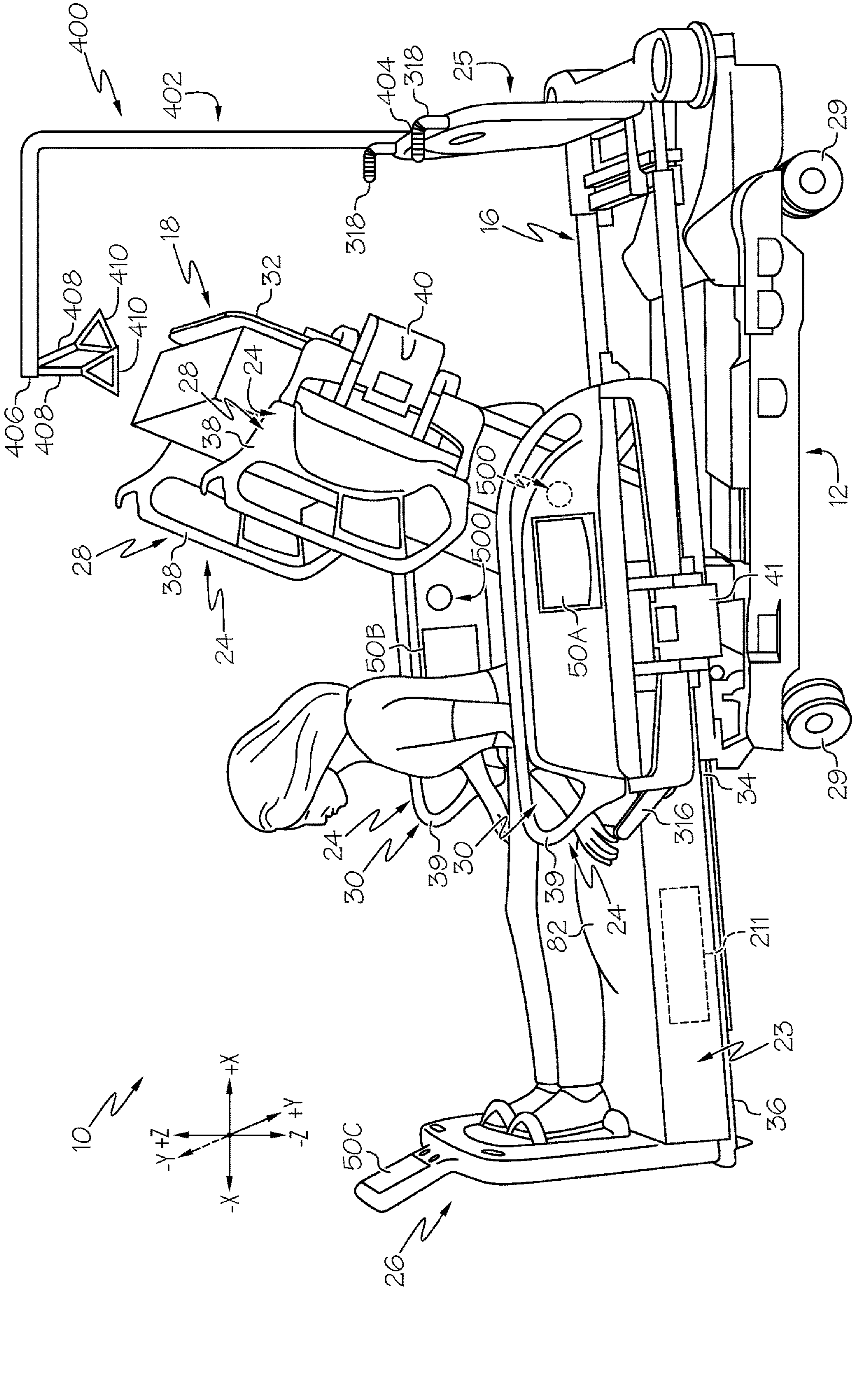
FIG. 6 schematically depicts a perspective view of the person support apparatus of FIGS. 1-3 with the head section in a fully inclined position and supporting a subject thereon, according to one or more embodiments shown and described herein.

As shown in FIGS. 5-7, in some embodiments, the person support apparatus 10 includes one or more side handles 316. The side handles 316 are generally positioned at opposite sides of the mattress 23 in a location that is accessible to a subject when positioned on the mattress 23. That is, the side handles 316 are generally positioned in a location to be reachable by a subject when the subject is positioned on the mattress 23. The side handles 316 may be positioned between the head section 32 and the foot section 36. For example, the side handles 316 may be attached or affixed to the side rails 24, the support surface 18, or the upper frame 16. In some embodiments, the side handles 316 may be molded as an extension of one or more components, such as, for example, the side rails 24, the support surface 18, or the upper frame 16.

In some embodiments, the side handles 316 may be fixed in position such that the side handles 316 are not movable. In other embodiments, the side handles 316 may be adjustable such that they may be moved to a position suited to a particular subject (e.g., moved toward to the head section 32 or toward to the foot section 36 such that the subject can reach the side handles 316). In some embodiments, the side handles 316 may be coupled to one or more link arms that are coupled to one or more actuators or motors that facilitate movement of the side handles 316 (e.g., to facilitate movement of the side handles 316 such that a subject moves in a rowing type motion).

The present disclosure is not limited to any particular shape, size, or configuration or the side handles 316. Thus, various shapes, sizes, and configurations are contemplated. In some embodiments, the side handles 316 may be shaped, sized, configured, and arranged such that a subject can grasp the side handles 316 for support and/or stabilization. In some embodiments, the side handles 316 may be shaped, sized, configured, and arranged such that, when the person support apparatus 10 is in a reverse Trendelenburg position, the subject may grasp the side handles 316 to complete dip exercises by lowering his/her body slightly via knee bending and using tricep and bicep muscles to push back upwards. In some embodiments, the side handles 316 may be fitted with one or more accessories, such as, for example, a grip or the like.

In some embodiments, the person support apparatus 10 also includes one or more head handles 318. The head handles 318 are generally positioned proximate an end of the mattress 23 proximate the headboard 25. For example, the head handles 318 may be attached or affixed to the head section 32 of the support surface 18, the headboard 25, or the upper frame 16. When the head handles 318 are attached or affixed to the head section 32 of the support surface 18, the head handles 318 remain reachable when the head section 32 rotates toward a raised position relative to the seat section 34. In some embodiments, the head handles 318 may be molded as an extension of one or more components, such as, for example, the headboard 25, the support surface 18, or the upper frame 16.

In some embodiments, the head handles 318 may be fixed in position such that the head handles 318 are not movable. As such, the head handles 318 may be useful in pushing or otherwise maneuvering the person support apparatus 10 by someone other than the subject on the mattress 23. In other embodiments, the head handles 318 may be adjustable such that they can be moved to a position suited to a particular subject (e.g., moved across the head section 32 in a direction toward the foot section 36 such that subjects of different heights can reach the head handles 318). In some embodiments, the head handles 318 may be coupled to one or more link arms that are coupled to one or more actuators or motors that facilitate movement of the head handles 318 (e.g., to facilitate movement of the head handles 318 such that a subject moves in a pulling type motion).

As with the side handles 316, the head handles 318 are not limited to any particular shape, size, or configuration. Thus, various shapes, sizes, and configurations are contemplated. In some embodiments, the head handles 318 may be shaped, sized, configured, and arranged such that a use can grasp the head handles 318 for support and/or stabilization. In some embodiments, the head handles 318 may be shaped, sized, configured, and arranged such that, when the person support apparatus 10 is in a reverse Trendelenburg position, the subject may grasp the head handles 318 to complete pull up exercises by using tricep and bicep muscles to pull upwards. In some embodiments, the head handles 318 may be fitted with one or more accessories, such as, for example, a grip or the like.

Sit Up Assistance

As illustrated in FIG. 5, the person support apparatus 10 is illustrated during a sit up assistance exercise in which the head section 32 assists the subject in performing sit ups in some embodiments. In such embodiments, one or more strain gauges 203 may be positioned in or on one of the mattress 23 or the head section 32 of the support surface 18. The strain gauge 203 is in communication with the controller area network system 222 and monitors a pressure applied against the head section 32 of the support surface 18 by the subject. Initially, the strain gauge 203 detects a baseline pressure. As the subject lifts his or her upper body away from the head section 32 during a sit up, the strain gauge 203 detects a change or reduction in pressure relative to the baseline pressure. When a change in pressure exceeding a predetermined threshold or reduction in pressure is detected (e.g., due to the subject attempting a sit up motion under his or her own strength), the head section actuator 43*a* is activated in a first direction to rotate the head section 32 toward the vertical position. Specifically, the predetermined threshold may be a percentage of the baseline pressure or a particular magnitude of a change in pressure relative to the baseline pressure. As such, the change in pressure is determined by identifying a pressure detected by the strain gauge 203 at a particular time and comparing that pressure to the baseline pressure. In the illustrative embodiment, the head section 32 raises between 30 degrees and 50 degrees to assist the subject in performing the sit up. It should be noted that other ranges of head section movement are contemplated to assist the subject. For example, the range may be any range between 0 degrees and 90 degrees. As discussed herein, the head section actuator 43*a* is only activated to rotate the head section 32 toward the vertical position and away from the upper frame 16 when the strain gauge 203 detects the change in pressure against the support surface 18 exceeds the predetermined reduction in pressure. As such, the head section actuator 43*a* may be operated as long as the predetermined reduction in pressure is detected or until a predetermined maximum predetermined angle is reached. If the subject begins to rest back on the head section 32 of the support surface 18, such that the strain gauge 203 does not detect the predetermined reduction in pressure applied against the head section 32 of the support surface 18 prior to reaching the predetermined maximum angle, the head section actuator 43*a* may be slowed or stopped to slow or stop the rotation of the head section 32.

The amount of assistance provided by the person support apparatus 10 during the subject's sit up exercise may be altered by adjusting the predetermined reduction in pressure necessary to activate the head section actuator 43*a*. For example, the head section actuator 43*a* may be activated at the detection of any reduction in pressure. In other embodiments, the predetermined reduction in pressure may be set by a caregiver or the subject to any value or percentage, e.g. 10% reduction in pressure, 15% reduction in pressure, 20% reduction in pressure, etc. In other embodiments, one or more force sensitive resistors (FSRs) or other types of sensors are provided on or in the mattress 23 or the head section 32 in addition to, or in lieu of, the one or more strain gauges 203.

In some embodiments, the head section 32 may also assist the subject with performing a second half of the sit up in the reverse direction as the subject moves back toward a horizontal position. In doing so, a predetermined maximum angle for the sit up is selected, such as 45 degrees when performing a partial sit up or 90 degrees when performing a full sit up. The predetermined maximum angle may be selected by operating any one of the user interfaces 50 or any other suitable user controls. Once the head section 32 reaches the predetermined maximum angle, the head section actuator 43*a* is deactivated to stop the head section 32 from rotating toward the vertical position. Thereafter, the head section actuator 43*a* is activated in an opposite second direction to rotate the head section 32 in the opposite direction toward the horizontal position to lower the head section 32 when the strain gauge 203 or the FSRs detect the predetermined reduction in pressure.

If the subject does not wish to move back toward the horizontal position after each sit up, a predetermined minimum angle may be selected in the same manner in which the predetermined maximum angle was selected. When the head section 32 reaches the predetermined minimum angle, the head section 32 will stop rotating toward the horizontal position. If the subject begins to rest back on the head section 32 prior to reaching the predetermined minimum angle so that the predetermined reduction in pressure is no longer detected, the head section actuator 43*a* may be slowed or stopped to slow or stop the rotation of the head section 32. Once the predetermined minimum angle is reached, further rotation of the head section 32 toward the horizontal position is prevented and the head section 32 will begin to rotate back toward the vertical position when the strain gauge 203 or the FSRs detect the predetermined reduction in pressure. The subject is also able to operate any one of the user interfaces 50 to select the number of repetitions, the length of time, the amount of assistance, the predetermined maximum and minimum angles, and any other parameters at which the head section 32 will operate during a sit up exercise. Data related to the subject's core exercise may be displayed on at least one of the user interfaces 50.

With more particularity, as noted herein, a subject's exercise regimen may be entered into any of the user interfaces 50. The exercise regimen may include a number of sets and a number of repetitions per set. The exercise regimen may also include the predetermined reduction in pressure. It is to be appreciated that the subject's exercise regimen may also be remotely set and transmitted to the person support apparatus 10 from any suitable wired or wireless device, such as the hospital server 111, a central computer, or a caregiver's mobile device. It is to be understood that the exercise regimen may also be programmed by a caregiver using any other suitable operating controls.

Leg Lift/Curl Assistance

As described above, the head section 32 and the foot section 36 of the support surface 18 each rotate with respect to the seat section 34 via the head section actuator 43*a* and the foot section actuator 43*c*, respectively. Referring now to FIGS. 6 and 7, in various embodiments, the foot section 36 may be configured to assist a subject in performing leg raise and/or leg curl exercises in a similar manner to that described above with respect to the head section 32 assisting in performing sit up exercises. Thus, the foot section 36 may assist the subject in performing leg raises in which the subject raises his or her legs off of the foot section 36 and/or leg curls in which the subject lowers, by curling and/or pressing, his or her legs onto the foot section 36. In this embodiment, one or more strain gauges 211 may be positioned on or in one of the mattress 23 or the foot section 36 of the support surface 18. Each strain gauge 211 monitors a pressure applied by the subject against the foot section 36. Initially, the strain gauge 211 detects a baseline pressure. With the person support apparatus 10 initially in the chair configuration, as shown in FIG. 10, the subject raises his or her legs and the strain gauge 211 detects a reduction in pressure against the foot section 36 relative to the baseline pressure. When a predetermined reduction in pressure is detected (e.g. due to the subject attempting to raise his or her legs under his or her own strength), the foot section actuator 43*c* is activated in a first direction to raise the foot section 36 toward the horizontal position, thereby assisting the subject in performing the leg raise exercise. Specifically, the predetermined threshold may be a percentage of the baseline pressure or a particular magnitude of a change in pressure relative to the baseline pressure. As such, the change in pressure is determined by identifying a pressure detected by the strain gauge 211 at a particular time and comparing that pressure to the baseline pressure. In the illustrative embodiment, the foot section 36 rotates from 90 degrees or the vertical position (FIGS. 10) to 180 degrees or the horizontal position (FIG. 9) during the leg raise exercise. It should be noted that other ranges of foot section movement are contemplated to assist the subject. For example, the range may be any range between 90 degrees and 180 degrees such as when the subject is not capable of fully extending or bending his or her legs. As discussed herein, the foot section actuator 43*c* is only operated to rotate the foot section 36 when the strain gauge 211 detects the predetermined reduction in pressure. As such, the foot section actuator 43*c* may be operated as long as the predetermined reduction in pressure detected.

The assistance provided by the person support apparatus 10 during the leg raise exercise may be altered by adjusting the predetermined reduction in pressure. For example, the foot section actuator 43*c* may be activated to rotate the foot section 36 toward the horizontal position once any reduction in pressure is detected. In other embodiments, the predetermined reduction in pressure may be set by the caregiver or the subject to any value or percentage, e.g. 10% reduction in pressure, 15% reduction in pressure, 20% reduction in pressure, etc. In other embodiments, one or more force sensitive resistors (FSRs) or other types of sensors are provided on or in the mattress 23 or the foot section 36 in addition to, or in lieu of, the one or more strain gauges 211.

In addition to assisting the subject with performing a leg raise exercise, in some embodiments, the foot section 36 also assists the subject with performing a leg curl exercise as the subject rotates his or her legs toward the bent position, thereby rotating the foot section 36 toward the vertical position. In doing so, a predetermined maximum angle between 90 degrees and 180 degrees is selected such as, for example, 180 degrees when rotating the foot section 36 to the horizontal position. In addition, a predetermined minimum angle between 90 degrees and 180 degrees is selected such as, for example, 90 degrees when rotating the foot section 36 to the vertical position. The predetermined maximum and minimum angles may be selected by operating any one of the user interfaces 50 or any other suitable user controls. Once the foot section 36 reaches the predetermined maximum angle, the foot section actuator 43*c* is deactivated from rotating the foot section 36 toward the horizontal position. Thereafter, the foot section actuator 43*c* is operated in a reverse direction to rotate the foot section 36 toward the vertical position when the at least one strain gauge 211 or the FSRs detect a change in pressure exceeding a predetermined threshold or increase in pressure. The subject is able to operate any one of the user interfaces 50 to select the frequency, the length of time, the amount of assistance during the leg raise/curl exercises, the predetermined maximum and minimum angles of incline and decline, the predetermined reduction or increase in pressure, and any other parameters at which the foot section 36 will operate during the leg raise/curl exercise. Thus, based on the selected number of repetitions or length of time for the leg raise/leg curl exercises, when the foot section 36 reaches the predetermined minimum angle, the foot section actuator 43*c* will deactivate and return to rotate the foot section 36 toward the horizontal position when the at least one strain gauge 211 or the FSRs detect the predetermined reduction in pressure.

Control of the foot section actuator 43*c* may operate continuously. For example, the foot section actuator 43*c* may be operated as long as the predetermined reduction or increase in pressure is detected. If the subject begins to lower his or her legs onto the foot section 36 prior to reaching the maximum angle so that the predetermined reduction in pressure is no longer detected, the foot section actuator 43*c* may be slowed or stopped to slow or stop the rotation of the foot section 36 toward the horizontal position. Similarly, if the strain gauge 211 fails to detect a change in pressure exceeding a predetermined increase in pressure applied against the foot section 36 prior to reaching the predetermined minimum angle, the foot section actuator 43*c* may be slowed or stopped to slow or stop the rotation of the foot section 36 toward the vertical position. Data related to the subject's core exercise may be displayed on at least one of the user interfaces 50. Additionally, as set forth above, at least one of the user interfaces 50 may communicate with the subject throughout the exercise to encourage the subject and notify the subject of progress.

With more particularity, the subject's exercise regimen may be entered into the user interfaces 50. The exercise regimen may include a number of sets and a number of repetitions per set. The exercise regimen may also include the predetermined reduction in pressure for leg lifts and for leg curls. It is to be appreciated that the subject's exercise regimen may also be remotely set and transmitted to the person support apparatus 10 from any suitable wired or wireless device, such as the hospital server 111, a central computer, or a caregiver's mobile device. It is to be understood that the exercise regimen may also be programmed by a caregiver using any suitable operating controls. The exercise regimen is communicated to the electronic control system 110, which monitors the strain gauge 211.

Bladder

Figure 8:
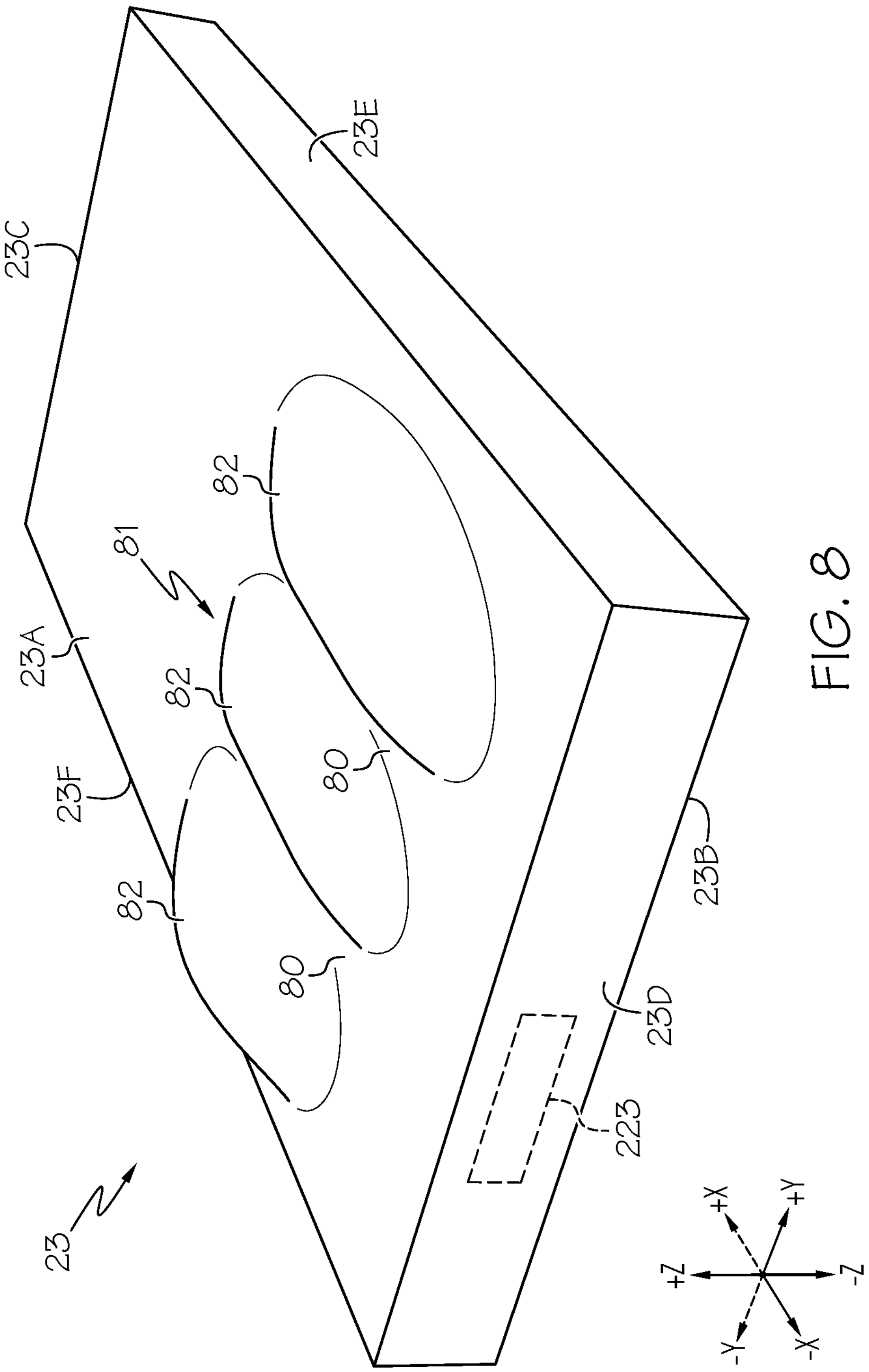
FIG. 8 schematically depicts a perspective view of an illustrative mattress of the person support apparatus of FIGS. 1-3, the mattress including a plurality of inflatable bladders, according to one or more embodiments shown and described herein.

Referring now to FIG. 8, in various embodiments, the mattress 23 of the person support apparatus 10 has a top surface 23A, an opposite bottom surface 23B, a head end 23C, a foot end 23D, and a pair of sides 23E, 23F. When the mattress 23 is positioned on the support surface 18, as shown in FIG. 1, the head end 23C of the mattress 23 is positioned proximate the head section 32 of the support surface 18 and the foot end 23D of the mattress 23 is positioned proximate the foot section 36 of the support surface 18. The mattress 23 has a knee support area 81 located at a position that aligns with the knees of the subject when laying on the mattress 23. Thus, the knee support area 81 is located closer to the foot end 23D of the mattress 23 than the head end 23C of the mattress 23.

In some embodiments, the mattress 23 includes at least one bladder 82 provided on or within the mattress 23 and located at the knee support area 81 for receiving a subject's legs to ensure that the person is properly positioned on the person support apparatus 10, as well as providing passive stretching. As shown in FIG. 8, three bladders 82 are provided in the mattress 23 and operable between an inflated state in which the bladders 82 extend above the top surface 23A of the mattress 23, as shown, and a deflated state in which the bladders 82 do not extend above the top surface 23A of the mattress 23. Together, when the bladders 82 are in the inflated state, the bladders 82 form a recess 80 in the top surface 23A of the mattress 23 between each adjacent pair of bladders 82. The recesses 80 have a depth defined by a height of the bladders 82 when in the inflated state. Thus, as the bladders 82 are inflated to a greater height, the depth of the recess 80 between adjacent bladders 82 becomes greater. Each of the recesses 80 receive and guide a subject's legs. More particularly, the recesses 80 may be formed to fit the subject's calves. When the subject's legs are placed between adjacent bladders 82 and within in the recesses 80, the bladders 82 maintain the subject's legs in longitudinal position while exercising/pushing against the footboard 26. Accordingly, the mattress 23 may provide passive guidance to the subject to enable the subject to utilize the footboard 26 or another exercise therapy feature described herein with proper form.

In some embodiments, the bladders 82 may be coupled to a bladder inflator 223 such as, for example, a pneumatic pump, in communication with the electronic control system 110. The bladder inflator 223 is configured to selectively inflate and deflate the bladders 82 by providing a fluid, such as a liquid or a gas, into the bladders 82 to cause the bladders 82 to inflate. As a non-limiting example, when the person support apparatus 10 is being used to perform exercises, such as the leg press exercise described herein above, the bladders 82 may be inflated to provide passive guidance to the subject. However, when the person support apparatus 10 is not being used for exercises (such as when the person support apparatus 10 is being used conventionally as a bed) the bladders 82 may be deflated, thereby providing a more conventional support surface. Moreover, even when the person support apparatus 10 is not being used for exercises, the bladders 82 may be inflated by activating the bladder inflator 223. This keeps the subject's legs in a fixed position or the knees in a slightly bent position when the subject's legs are positioned between adjacent bladders 82 and within respective recesses 80.

Figure 9:
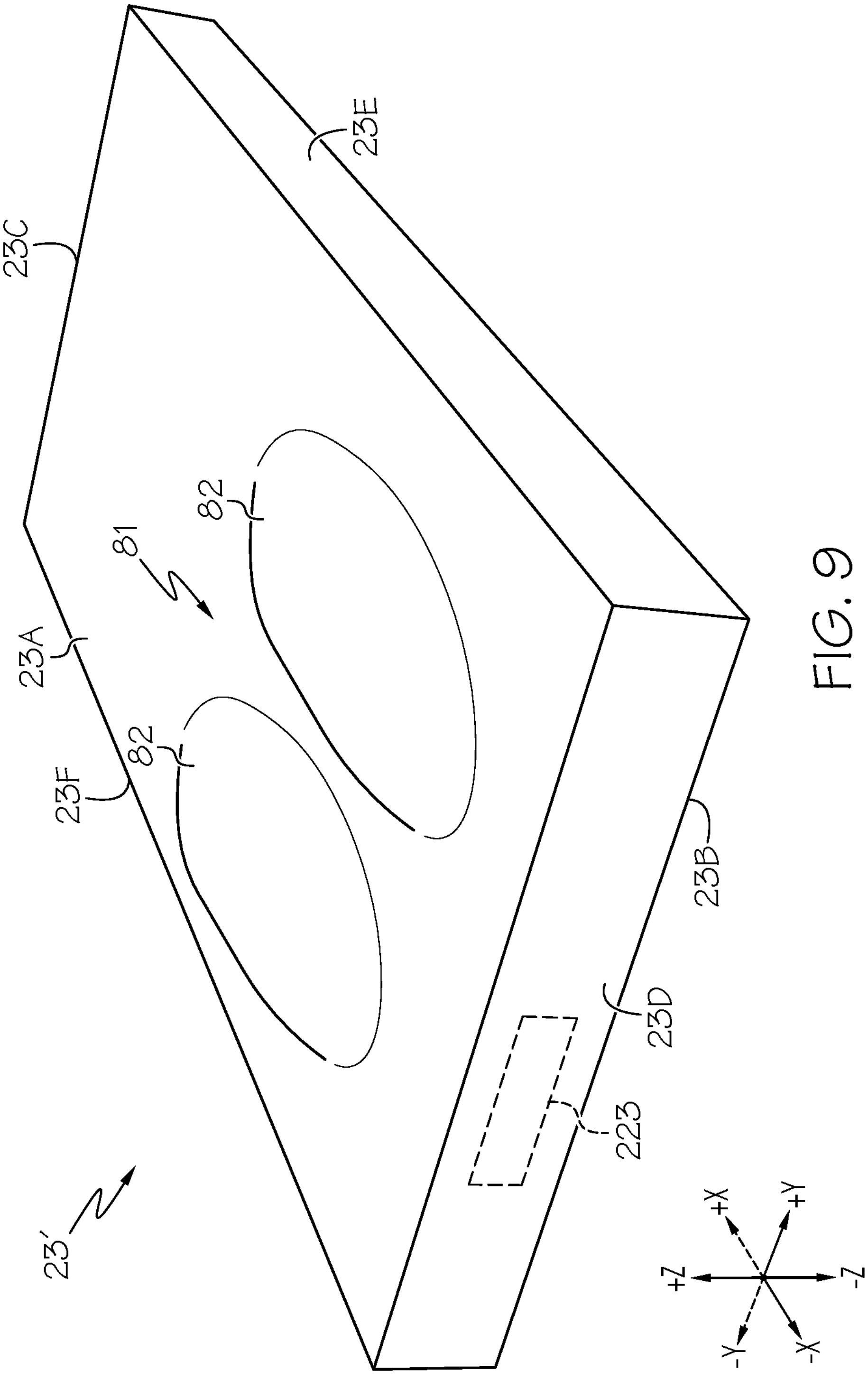
FIG. 9 schematically depicts a perspective view of another illustrative mattress of the person support apparatus of FIGS. 1-3, the mattress including a pair of inflatable bladders, according to one or more embodiments shown and described herein.
Figure 10:
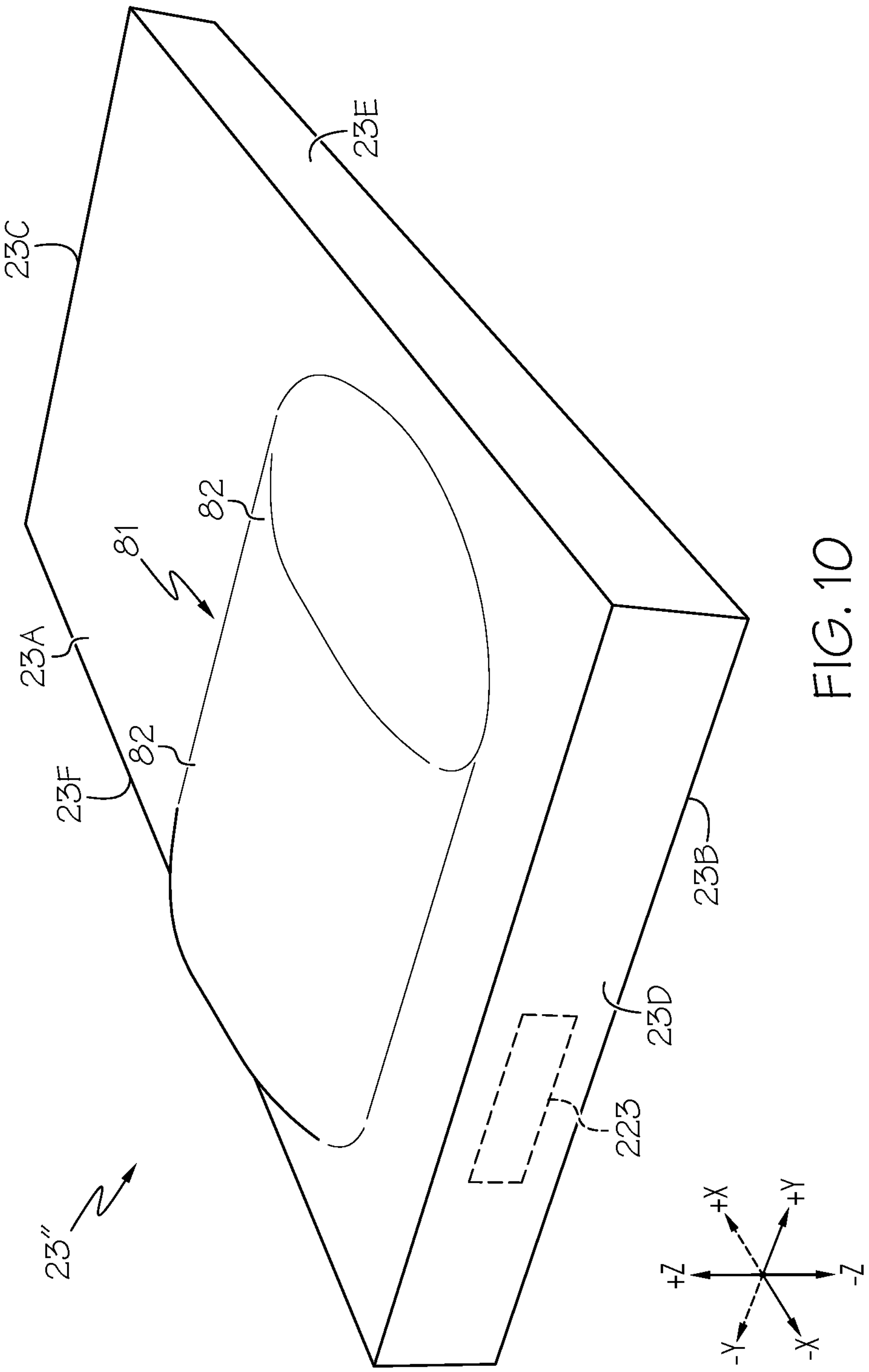
FIG. 10 schematically depicts a perspective view of an illustrative mattress of the person support apparatus of FIGS. 1-3, the mattress including a single inflatable bladder, according to one or more embodiments shown and described herein.

In another embodiment, as shown in FIG. 9, a mattress 23' is shown including a pair of bladders 82 in which each bladder 82 is to be positioned directly under a corresponding knee of the subject as opposed to opposite sides of the subject's legs. In this embodiment, the bladders 82 are utilized to provide passive exercise to bend one or both of the subject's legs at the knee. This is beneficial for subjects that are unable to get out of bed to stretch, bend, or otherwise move his or her legs to ensure adequate blood circulation. In addition, providing this stretching/bending exercise to the subject's legs ensures that the tendons behind the knee do not become stiff which can lead to further complications. In doing so, the bladders 82 may be repeatedly inflated and deflated. When one of the bladders 82 are inflated, the bladder 82 applies a force against the subject's leg causing the subject's knee to bend at the respective bladder 82 in a direction away from the mattress 23. Alternatively, when the bladder 82 is deflated, the bladder reduces the force against the subject's leg and permits the subject's knee to straighten and the leg to return to its initial horizontal position. It is to be appreciated that each bladder 82 may be continuously circulated between the inflated state and the deflated state either in unison or independently of the other bladder 82.

As stated above, each of the bladders 82 may alternate between the inflated state and the deflated state in opposition of one another, thereby alternating between stretching the subject's right and left legs. In this case, the bladder 82 under each leg may be repeatedly inflated and deflated for a specified number of repetitions or for a specified period of time. Alternatively, employing the pair of bladders 82 allows for different stretching routines to be provided to each leg. The subject is able to utilize any suitable controls, such as the user interfaces 50, to set either one or both of the bladders 82 to inflate and deflate for any number of repetitions and for a predetermined period of time to provide the necessary stretching the subject's legs. In addition, each bladder 82 may be set to inflate and deflate at various intervals to provide a desired resting period between inflation and deflation. Further, the subject may set the rate at which the bladders 82 will inflate to prevent too quick of an inflation or deflation, thereby straining the subject's legs. Even further, the subject may also set the degree of inflation to cause the bladders 82 to inflate to a greater or lesser height. As noted above, it is to be understood that each of the bladders 82 can be assigned a specific set of bladder operating parameters, thereby providing different stretches to each leg based on the specific injury and the rehabilitation needs of the subject. For example, it may be desired that the bladder 82 below the right leg inflates to a higher degree, at twice the rate, or for twice as long as the bladder 82 below the left leg.

In some embodiments, as illustrated in FIG. 10, a mattress 23" may include only a single bladder 82 at the knee support area 81 and extending in a direction transverse to a longitudinal axis of the mattress 23". Thus, as the bladder 82 is inflated, the bladder 82 raises both legs of the subject at the knee causing the subject's knees to bend. As the bladder 82 deflates, the subject's legs straighten to stretch the muscles behind the knee of each leg. As with the embodiments of the bladders 82 discussed herein, the inflation and deflation of the bladder 82 is controlled by utilizing any of the user interfaces 50 or any other suitable user controls, for example, to automatically inflate the bladder 82 for any number of repetitions and for a predetermined period of time. For example, the subject may set the bladder 82 to inflate 10, 20, or 30 times, or repeatedly for a period of 1, 2, or 3 minutes. In addition, the subject can set the rate at which the bladder 82 will inflate to prevent too quick of an inflation or deflation, thereby straining the subject's legs. Furthermore, the subject may also set the degree of inflation to cause the bladder 82 to inflate to a greater or lesser height. When the bladder 82 inflates to a greater height, this results in a greater bend being formed in the subject's legs as opposed to a lesser inflation, provides only a slight bend formed therein.

Subject Helper System

Figure 11:
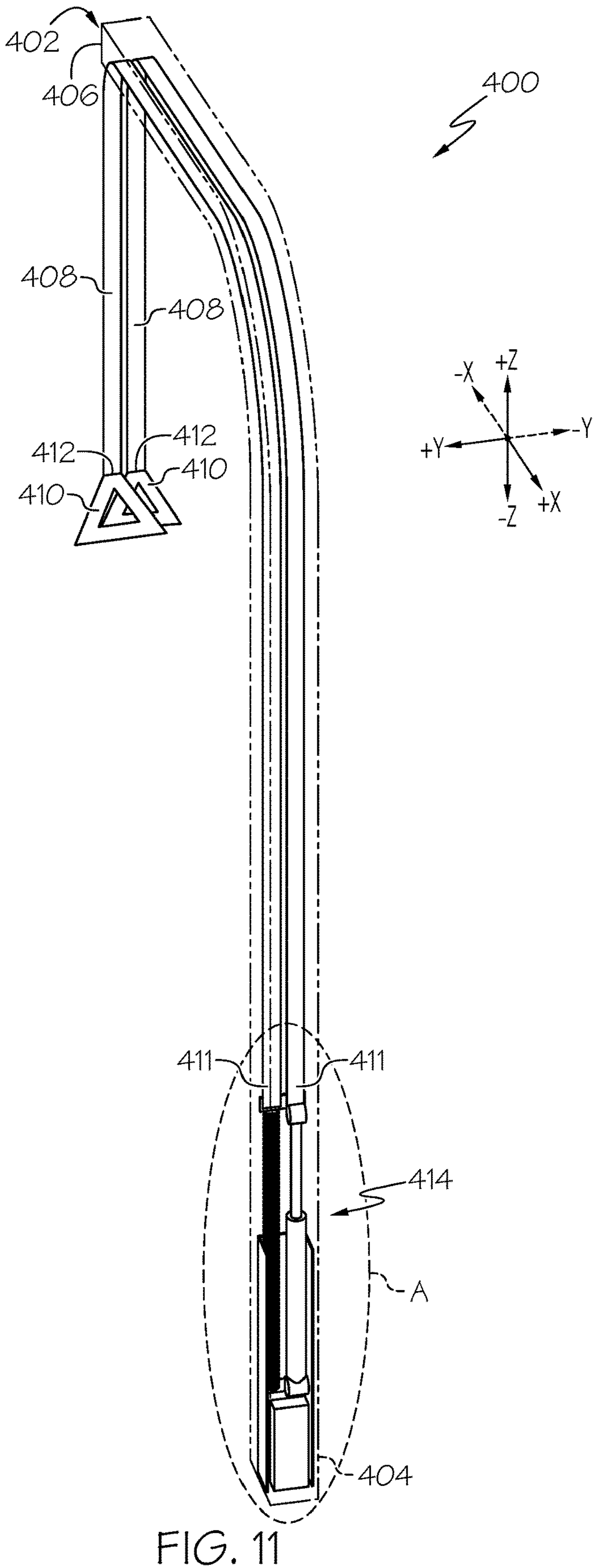
FIG. 11 schematically depicts a partially transparent perspective view of an illustrative subject helper system of the person support apparatus of FIGS. 1-3, according to one or more embodiments shown and described herein.
Figure 12:
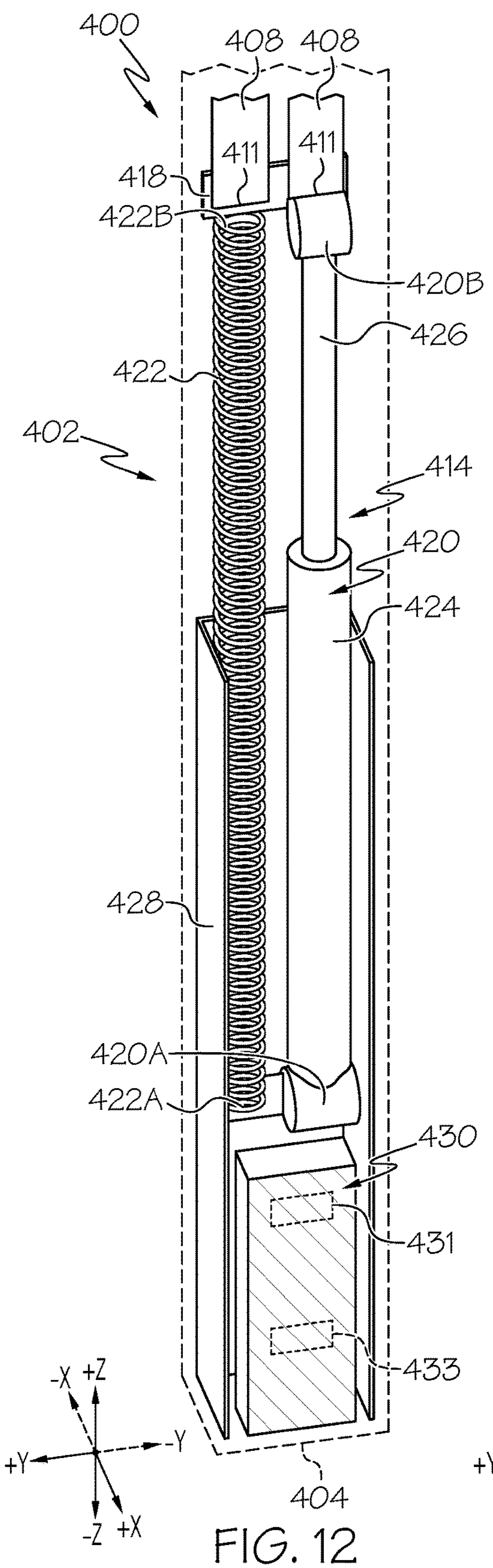
FIG. 12 schematically depicts an enlarged perspective view of an illustrative tensioning assembly of the subject helper system of FIG. 11 as shown in circle A of FIG. 11, according to one or more embodiments shown and described herein.

Referring now to FIGS. 11 and 12, the subject helper system 400 discussed herein is shown separate from the rest of the person support apparatus 10. As discussed above, the subject helper system 400 includes a tube 402 having a first end 404 and a second end 406. At least one belt 408 extends through an interior of the tube 402 and extends out of the second end 406 of the tube 402. As shown, a pair of belts 408 are provided. Each belt 408 has a first end 411 and an opposite second end 412. The belts 408 may generally be constructed of any material. For example, in some embodiments, the belts 408 may be automotive grade belts and encapsulated in vinyl. A tensioning assembly 414 is coupled to the first end 411 of the belts 408 for adding resistance and a handle 410 is attached to the second end 412 of each belt 408 to facilitate gripping and pulling of the belts 408 in a first direction toward the subject to perform an upper body exercise. As the handles 410 are released and the force pulling the handles in the first direction is reduced, the belts 408 retract back into the tube 402 in an opposite second direction due to the resistance provided by the tensioning assembly 414, as described in more detail herein.

The handles 410 may be any suitable geometry to facilitate gripping by the subject. As shown, the handles 410 are triangular shaped, but may be circular, curved bars, or any other shape. Additionally, the handles 410 may be disengaged from the second end 412 of each belt 408 using any suitable releasable fastening mechanism, such as clips, hooks, or the like, to attach different handles 410 to the belts 408. In some embodiments, the handles 410 are attachable to one another using any suitable means to prevent independent movement when not in use. In some embodiments, an inner surface of each handle 410 includes a magnet for attracting an opposite handle 410. Thus, when not in use, the handles 410 may be attached to one another. Other suitable means for fastening the handles 410 when not in use are contemplated such as snaps, hook and loop fasteners, and the like.

The first end 411 of each belt 408 is attached to a mount 418 to ensure that the belts 408 move in unison with one another. As such, it is understood that, in this embodiment, the belts 408 are not capable of moving through the tube 402 independently of one another when pulled by a corresponding handle 410. Although not shown, it is to be understood that some embodiments of the subject helper system 400 may include a single belt 408 that separates into two distinct belt sections at some point along the length of the belt 408, thereby forming a Y-configuration proximate the second end 412 of the belt 408. Thus, the first end 411 of the belt 408 is secured to the mount 418 and splits into the two distinct belt sections proximate the second end 412 of the belt 408 to attach to the two separate handles 410. It is worth noting that this embodiment of the belt 408 may be utilized so long as the distance between an end of each separated belt section is far enough from the point of separation along the belt 408, for example, a shoulder width from the point of separation, to permit the subject to pull the handles 410 in the desired direction without restriction.

As shown in FIG. 12, the tensioning assembly 414 of the subject helper system 400 coupled to the first end 411 of the belt 408 is illustrated in greater detail. In some embodiments, the tensioning assembly 414 includes a shock 420 and a biasing member 422 positioned in a side-by-side arrangement. The shock 420 has a first end 420*a* and a second end 420*b*. The shock 420 such as, for example, a damper or a gas shock, includes a cylinder 424 and a piston 426 extendable within the cylinder 424 to increase and decrease the length of the shock 420 between the first end 420*a* and the second end 420*b*. The cylinder 424 of the shock 420 is fixed to a bracket 428 disposed within and fixed to the tube 402 in any suitable manner, such as a fastener, welding, or the like, for securing the cylinder 424 in position relative to the tube 402. Further, the first end 420*a* of the shock 420 is fixed to the mount 418 for drawing the piston 426 out of the cylinder 424 as the belts 408 are pulled in the first direction and out of the second end 406 of the tube 402.

The biasing member 422 such as, for example, a spring, has a first end 422*a* and a second end 422*b*. The first end 422*a* of the biasing member 422 is secured to the bracket 428, and the second end 422*b* of the biasing member 422 is secured to the mount 418. The biasing member 422 may be secured to the bracket 428 and the mount 418 in any suitable manner such, as by using a fastener, hook and loop, welding, or the like. Thus, as the belts 408 are pulled in the first direction and out of the second end 406 of the tube 402, the second end 420*b* of the shock 420 and the second end 422*b* of the biasing member 422 are pulled therewith by virtue of being connected to the mount 418 secured to the first ends of the belts 408. As such, the biasing member 422 adds resistance to the belts 408 when pulled in the first direction. As the force pulling the belts 408 in the first direction is reduced, the biasing member 422 pulls the belts 408 back toward the first end 404 of the tube 402 in the second direction. The shock 420 provides controlled recoil of the biasing member 422 to prevent the belts 408 from quickly returning to an initial position (e.g., a rest position). Although not shown, it is to be understood that the shock 420 and the biasing member 422 may be formed as a single unit, such as a shock absorber or linear damper.

In some embodiments, a monitoring device 430 is positioned within the tube 402 proximate the first end 420*a* of the biasing member 422. The monitoring device 430 includes a force sensing gauge 431 mechanically coupled to the biasing member 422 to detect a pulling force and a switch 433 configured to count the number of repetitions that the belts 408 are pulled in the first direction and returned to the original position. The force sensing gauge 431 may be configured to detect the pulling force by monitoring tension of the biasing member 422. The switch 433 may be configured to detect the number of repetitions by detecting extension and retraction of the biasing member 422. In some embodiments, the force sensing gauge 431 and the switch 433 may be fixed to the second end 422B of the biasing member or the mount 418 to translate with the biasing member 422 as the belts 408 are pulled. The monitoring device 430, specifically the force sensing gauge 431 and the switch 433, are in electrical communication with the electronic control system 110. As such, data from the monitoring device 430 is transmitted to the electronic control system 110 to track an exercise routine of the subject in the person support apparatus 10. This data may be displayed on any of the user interfaces 50 to provide feedback to the subject. As a result, data pertaining to the exercise routines may be logged in the electronic control system 110. This allows for progress of the subject to be tracked, as with any of the exercises discussed herein, which may be necessary for insurance reimbursement purposes.

Figure 13:
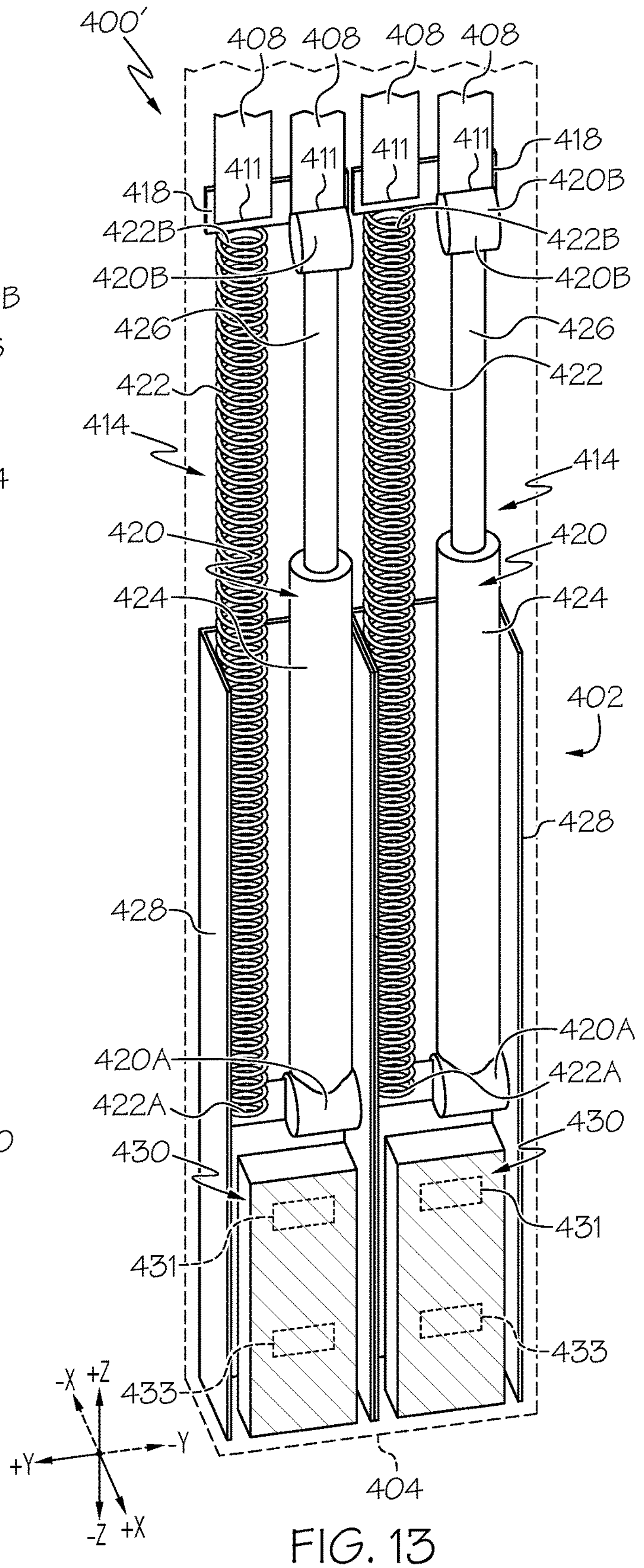
FIG. 13 schematically depicts a perspective view of another illustrative subject helper system including a pair of tensioning assemblies, according to one or more embodiments shown and described herein.

Referring now to FIG. 13, an embodiment of a subject helper system 400' may be provided including a pair of tensioning assemblies 414 allowing for the belts 408 to extend through the tube 402 independently of one another.

It should be appreciated that the tensioning assemblies 414 may be identical to one another and, as such, each tensioning assembly 414 includes a shock 420 and a biasing member 422 coupled to a corresponding belt 408 via a mount 418. At least one belt 408 extends from a corresponding mount 418 and to a corresponding handle 410. The tensioning assemblies 414 are provided in a side by side arrangement within a bracket 428, which may have an increased width to house both tensioning assemblies 414. Further, the subject helper system 400' may include a pair of monitoring devices 430 with each monitoring device 430 connected to an associated tensioning assembly 414 to measure the force and number of repetitions exhibited by each tensioning assembly 414.

Figure 14:
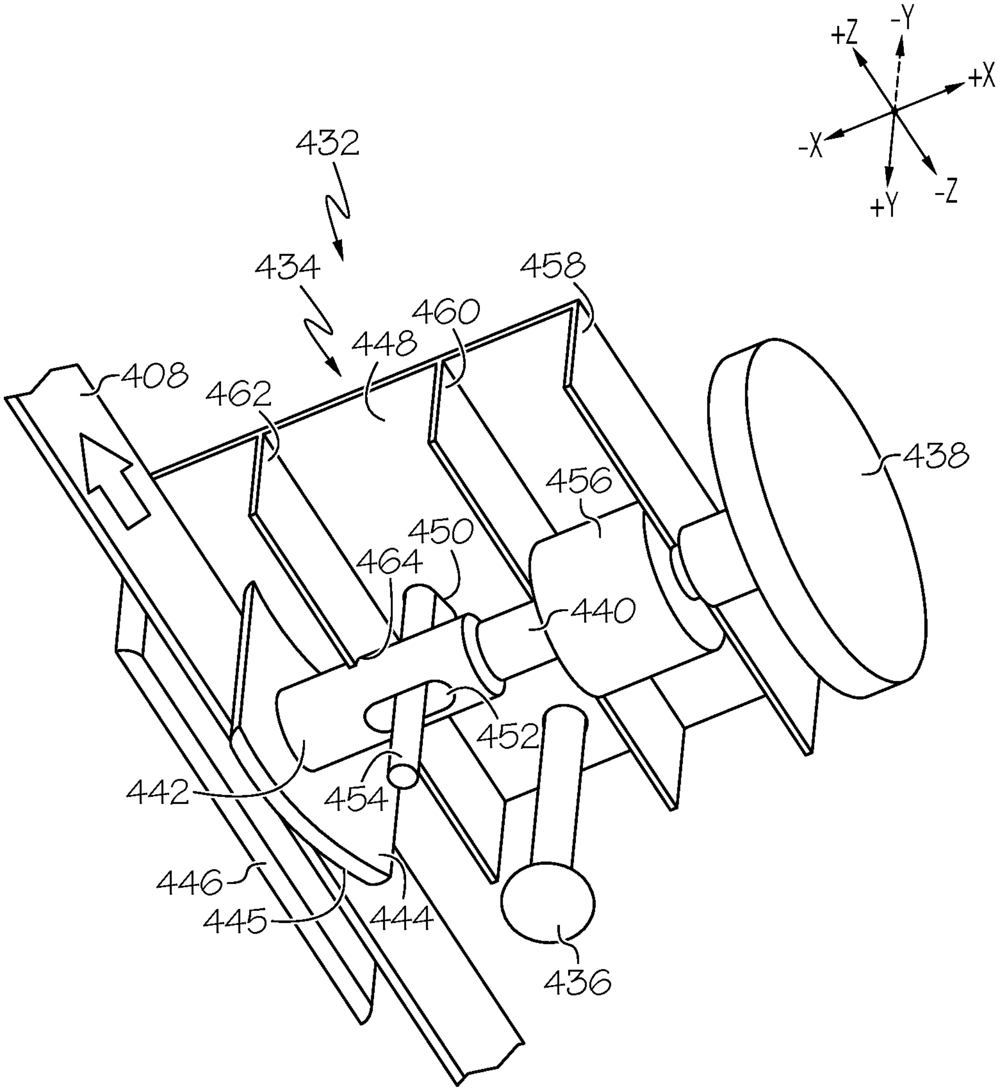
FIG. 14 schematically depicts a partial perspective view of an illustrative friction mechanism of a subject helper system during an extension operation, according to one or more embodiments shown and described herein.
Figure 15:
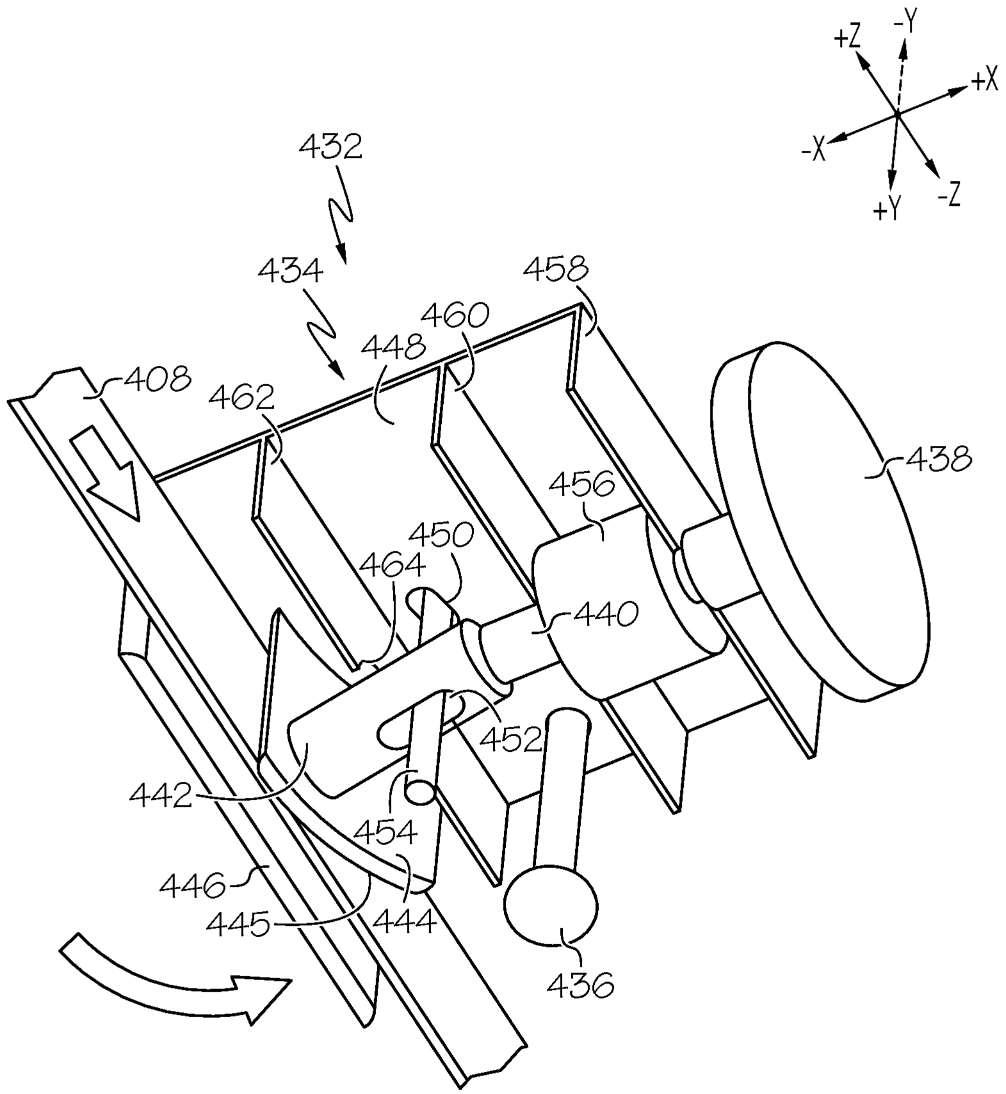
FIG. 15 schematically depicts a partial perspective view the friction mechanism of FIG. 14 during a retraction operation, according to one or more embodiments shown and described herein.

In some embodiments, as shown in FIGS. 14 and 15, a friction mechanism 432 may be provided to adjust the amount of resistance against the belt 408 without adjusting the tensioning assembly 414 itself. It should be appreciated that when a pair of tensioning assemblies are provided, such as the pair of tensioning assemblies 414 of the subject helper system 400', a friction mechanism 432 may be associated with each belt 408 coupled to a corresponding tensioning assembly 414. The friction mechanism 432 discussed herein is just one illustrative example of providing friction on the belts 408, however, other friction assemblies are contemplated.

In embodiments, the friction mechanism 432 includes a housing 434 positioned within and fixed to the tube 402 of the subject helper system 400 by any suitable fastening mechanism. For example, the housing 434 may be secured to the tube 402 by a mounting bolt 436 extending through the tube 402. In some embodiments, the housing 434 may be a one piece monolithic structure integrally formed with the tube 402. The friction mechanism 432 includes an adjusting knob 438 accessible from an exterior of the subject helper system 400. The adjusting knob 438 is fixed to a spacer 456 positioned between a pair of walls 458, 460 of the housing 434. A threaded pin 440 extends through and threadedly engages the spacer 456. The friction mechanism 432 further includes a shaft 442 pivotally attached to an end of the threaded pin 440 opposite the spacer 456. The shaft 442 may be pivotally attached to the threaded pin 440 in any suitable manner such that the shaft 442 is configured to pivot 442 with respect to the threaded pin 440. As discussed herein, rotation of the adjusting knob 438 rotates the spacer 456, which causes the threaded pin 440 to further engage or retract out of the spacer 456 based on a direction of rotation of the adjusting knob 438.

The housing 434 further includes a side wall 448 having an arcuate aperture 450 formed therein and a corresponding elongated aperture 452 is formed in the shaft 442. A sliding pivot 454 extends through the arcuate aperture 450 in the side wall 448 and the elongated aperture 452 in the shaft 442 to facilitate pivoting of the shaft 442 with respect to the threaded pin 440. The shaft 442 is permitted to move toward and away from the belt 408 since the elongated aperture 452 is larger than a diameter of the sliding pivot 454. Thus, as described in more detail herein, the shaft 442 may pivot relative to the threaded pin 440 between an unpivoted position, as shown in FIG. 14 when the belt 408 is being pulled out of the tube 402 in the first direction, and a pivoted position, as shown in FIG. 15 when the belt 408 is being retracted back into the tube 402 in the second direction. In some embodiments, the housing 434 includes a partition wall 462 extending perpendicular to the side wall 448 and includes a cutout 464 formed therein. The shaft 442 extends through the cutout 464 in the partition wall 462 from the threaded pin 440 toward the belt 408. The cutout 464 permits limited movement of the shaft 442 between the unpivoted position and the pivoted position as the shaft 442 contacts an edge of the cutout 464.

A first pad 444 is attached to an end of the shaft 442 opposite the threaded pin 440 for frictionally pressing against the belt 408. In some embodiments, the first pad 444 is formed from highly frictional materials. In some embodiments, as shown, the first pad 444 is a delrin pad having an arcuate belt surface 445 that pivots in and out of engagement with the belt 408 based on a moving direction of the belt 408. In other embodiments, the first pad 444 may be a wheel having a high or variable resistance mode.

A second pad 446 may be fixed to the housing 434 opposite the adjusting knob 438 such that the belt 408 is positioned to extend between the first pad 444 and the second pad 446. In some embodiments, the second pad 446 is formed from a highly frictional material. In some embodiments, the second pad 446 may be a delrin pad. Alternatively, when the second pad 446 is not provided, the belt 408 may extend between the first pad 444 and a wall of the housing 434 or, alternatively, an interior surface of the tube 402 itself. Although not shown, a biasing member, such as a spring, may be provided within the housing 434 or within the shaft 442 itself to bias the shaft 442 relative to the threaded pin 440 and toward the unpivoted position.

In use, rotation of the adjusting knob 438 in a first direction translates the threaded pin 440, the shaft 442, and the first pad 444 closer to the belt 408, thereby increasing tension against the belt 408 between the first pad 444 and the second pad 446, if provided. Similarly, rotation of the adjusting knob 438 in an opposite second direction translates the threaded pin 440, the shaft 442, and the first pad 444 away from the belt 408, thereby decreasing tension against the belt 408 between the first pad 444 and the second pad 446, if provided. As noted above, the shaft 442 is permitted to move toward and away from the belt 408 since the elongated aperture 452 formed in the shaft 442 is larger than the diameter of the sliding pivot 454.

As the belt 408 moves in the first direction to extend out of the tube 402, as shown in FIG. 14, an upward pivoting force is applied against the first pad 444 by the belt 408 and the sliding pivot 454 abuts against an upper end of the arcuate aperture 450 formed in the side wall 448 of the housing 434. This maintains the shaft 442 in the unpivoted position. It should be appreciated that the cutout 464 formed in the partition wall 462 of the housing 434 also limits the amount of pivoting of the shaft 442 relative to the threaded pin 440. With the shaft 442 in the unpivoted position, friction on the belt 408 by the first pad 444 is increased, thereby adding resistance against the belt 408 when pulled in the first direction.

When the belt 408 moves in the second direction and retracts back into the tube 402, as shown in FIG. 15, movement of the belt 408 causes the first pad 444 and the shaft 442 to pivot downwardly with respect to the threaded pin 440 into the pivoted position. In doing so, the sliding pivot 454 moves to an opposite end of the arcuate aperture 450 in the side wall 448 of the housing 434. Thus, the amount of contact on the belt 408 by the first pad 444 is reduced, thereby reducing the amount of friction against the belt 408 and allowing the belt 408 to more freely retract back into the tube 402 in the second direction.

It is to be understood that the friction mechanism 432 may be manually operated to adjust the position of the shaft 442 and the first pad 444 within the tube 402 by rotating the adjusting knob 438. In some embodiments, the friction mechanism 432 may be automatically adjusted by controlling rotation of the adjusting knob 438 or the axial position of the threaded pin 440 itself, such as by using a motor or the like to operate the adjusting knob 438 or the shaft 442 directly. When the friction mechanism 432 is automatically operated, the friction mechanism 432 is in electronic communication with a power supply, such as power supply 135 (FIG. 4). It should further be appreciated that, when a pair of friction mechanisms 432 are provided, such as when the pair of tensioning assemblies 414 are provided, each friction mechanism 432 may be adjusted, manually or automatically, independently of the other friction mechanism 432.

The friction mechanism 432 may be provided within the tube 402 at any suitable location to control an amount of friction against the belt 408 and which may be accessible by the subject or some other operator. As such, the friction mechanism 432 may be located proximate the first end 404 of the tube 402, proximate the second end 406 of the tube 402, or at any location therebetween along which the belts 408 extend.

When the friction mechanism 432 is utilized on the subject helper system 400 depicted in FIG. 12, the monitoring device 430 of the subject helper system 400 may detect the friction force applied against the belt 408 by the friction mechanism 432 to determine an actual force being performed by the subject during an exercise routine. Such a functionality may be added via a friction detection device 435 (FIG. 4) provided within the friction mechanism 432. For example, in some embodiments, the spacer 456 is a linear position sensor and functions as the friction detection device 435 to detect the amount of displacement of the threaded pin 440 and, thus, the amount of friction on the belt 408. In this embodiment, the spacer 456 is in electronic communication with the monitoring device 430 or the electronic control system 110 directly. Thus, a force reading provided by the monitoring device 430 may be adjusted to account for a force reading provided by the spacer 456.

The friction detection device 435 may be any suitable mechanism for measuring friction imparted on the belt 408 by the friction mechanism 432. In some embodiments, the friction detection device 435 is a sensor or imaging device configured to measure a position of the first pad 444 relative to the spacer 456 and, thus, how much friction is imparted on the belt 408 by the first pad 444. In other embodiments, the second pad 446, if provided, may include a force pressure pad provided on a surface thereof to abut against the belt 408 opposite the first pad 444 and configured to measure a force applied on the belt 408 by the first pad 444. Alternatively, the force pressure pad may be provided directly on the tube 402 itself and opposite the first pad 444 if the second pad 446 is not provided.

In any event, the measured position or force detected by the friction detection device 435 may then be converted to a value stored within one of the memory components 204, 209 of the electronic control system 110 or the monitoring device 430 to determine how much friction is applied onto the belt 408. Thereafter, the amount of force initially determined by the monitoring device 430 is adjusted, i.e., increased, by the converted value to determine an adjusted force performed by the subject. Thus, despite the monitoring device 430 detecting an amount of resistance at the tension assembly 414, the monitoring device 430 takes into account the friction on the belt 408 imparted by the friction mechanism 432.

Exercise Band Tie Down

Figure 16:
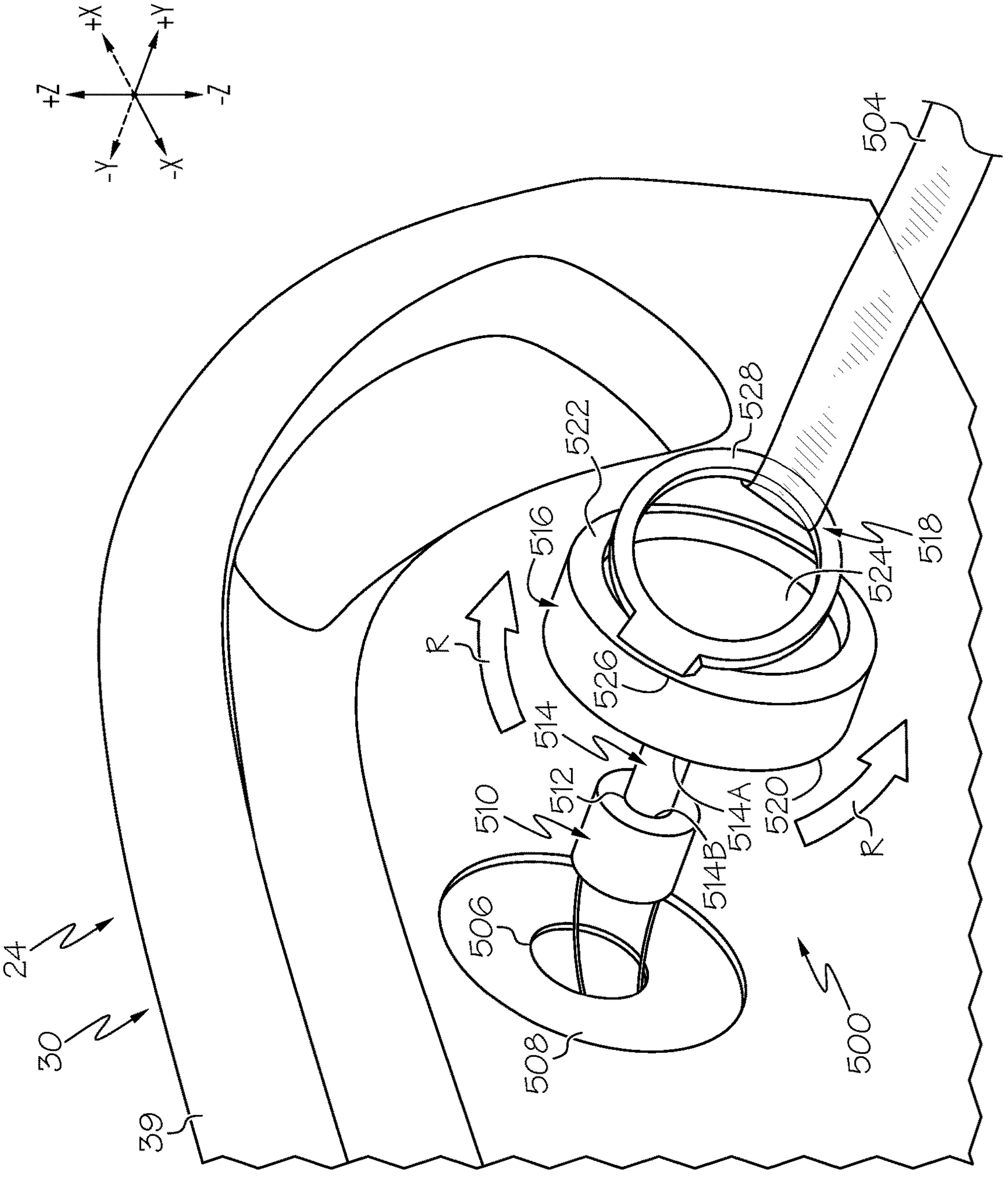
FIG. 16 schematically depicts an exploded perspective view of an illustrative attachment device including a rotational potentiometer, according to one or more embodiments shown and described herein.

As noted above and illustrated in FIGS. 2 and 3, the person support apparatus 10 includes a pair of side rails 24, which may include a head side rail 28 and an intermediate side rail 30. Each intermediate side rail 30 includes an attachment device 500 for attaching an associated exercise band. As shown in FIG. 16, the attachment device 500 is shown in an exploded view with the attachment device 500 partially removed from the intermediate side rail 30. However, it is to be understood that the attachment device 500 lies flush with the intermediate side rail 30 when in use to avoid inadvertent contact by a subject. More particularly, the intermediate side rail 30 includes a recessed portion 508 and an aperture 506 formed therein. The recessed portion 508 and the aperture 506 cooperate to receive the attachment device 500 and permit the attachment device 500 to lie flush with the intermediate side rail 30. The attachment device 500 may be secured within the recessed portion 508 and the aperture 506 using any suitable fastening mechanism such as, for example, threaded fasteners, clasps, and the like.

The attachment device 500 includes a potentiometer 510 having a channel 512 extending axially therethrough. The potentiometer 510 may be a 3-axis load cell or any other suitable device for recognizing rotation and directional force of an object engaging the channel 512, as discussed in more detail herein. The attachment device 500 includes a shaft 514 having a first end **514*a* and a second end 514*b*. A plate 516 is attached to the first end 514*a* of the shaft 514, and a ring 518 is pivotally attached to the plate 516 opposite the shaft 514. Thus, the ring 518 is pivotable between an unfolded position, as shown, and a folded position. More particularly, the plate 516 has a first surface 520 attached to the first end 514*a* of the shaft 514 and an opposite second surface 522 having a groove 524 formed therein for receiving the ring 518** when in the folded position.

In some embodiments, the ring 518 has a hinge end 526 and an opposite distal end 528. The ring 518 is pivotally connected to the second surface 522 of the plate 516 at the hinge end 526 and may include a biasing member (not shown), such as a spring, for biasing the ring 518 toward the folded position when not in use. The ring 518 allows an exercise band 504 to be secured to the attachment device 500 to permit a subject to perform exercise routines using the exercise band 504, such as curls, presses, lifts, and the like, by pulling the exercise band 504 away from the attachment device 500. The exercise band 504 is a stretchable band that provides resistance as a subject grips the exercise band 504 and pulls the exercise band 504 away from the attachment device 500. The exercise band 504 is attached to the distal end 528 of the ring 518 in any suitable manner, such as by tying the exercise band 504 to the ring 518, to provide consistent readings as opposed to the exercise band 504 moving freely between the distal end 528 and the hinge end 526.

The second end **514*b* of the shaft 514 is inserted into and engages the channel 512 of the potentiometer 510. Although not shown, in some embodiments, the shaft 514 includes teeth for engaging internal grooves of the channel 512. Thus, rotation of the shaft 514 results in rotation of the channel 512 within the potentiometer 510. The potentiometer 510 is configured to rotate of the plate 516, as shown by arrows R, in response to rotation of the channel 512. In addition, as noted above, the potentiometer 510 is configured to sense directional force by recognizing a force applied against the channel 512 by the shaft 514. Potentiometers are well-known in the art and, thus, description of the manner in which the potentiometer 510** detects a directional force is not discussed in more detail herein.

The potentiometer 510 is in electrical communication with the electronic control system 110 discussed herein. As such, data from the potentiometer 510, including rotational direction data and force data at the channel 512, is transmitted to the electronic control system 110. As described herein, the electronic control system 110 is configured to process the rotational direction data to determine what specific exercise routine is being performed. In making this determination, the electronic control system 110 also takes into account the position of the support surface 18 to identify the orientation of the subject, i.e., the upper frame 16 (FIG. 1), when the exercises are being performed. Examples of particular exercises that may be determined are described below with reference to the support apparatus 10 in FIGS. 2 and 16.

In one non-limiting example, a subject in a supine position with the head section 32 of the support surface 18 in a horizontal position may perform a curl exercise by gripping the exercise band 504 and pulling the exercise band 504 toward his or her chest. By performing this motion, the ring 518 will orient itself in a first position, thereby rotating the channel 512 of the potentiometer 510 accordingly. The potentiometer 510 will detect this rotation of the channel 512 and transmit the rotation direction data to the electronic control system 110. The electronic control system 110 determines that, based on the channel 512 of the potentiometer 510 being rotated to the first position and the head section 32 of the support surface 18 being reclined, the exercise being performed is a curl exercise. Specifically, the electronic control system 110 identifies that the direction in which the exercise band 504 is being pulled is substantially parallel to the head section 32 of the support surface 18, which indicates a curl exercise is being performed. It should be appreciated that, without identifying the position of the head section 32 during this exercise, the electronic control system 110 may alternatively determine that a different exercise, such as a chest pull, was being performed.

In another non-limiting example, if the head section 32 of the support surface 18 is inclined to, for example, 90 degrees from the upper frame 16 and the subject performs the same curl exercise, the plate 516 will be rotated to a second position in which the exercise band 504 is pulled in a direction substantially perpendicular to the first direction due to the direction of the pulling force being directed in a vertical direction perpendicular to the longitudinal axis of the person support apparatus 10. However, the electronic control system 110 is configured to determine that the pulling force applied by the exercise band 504 against the channel 512 is still directed in a direction substantially parallel to the head section 32 of the support surface 18 and, therefore, the same curl exercise is being performed. Again, without identifying the position of the head section 32 during this exercise, the electronic control system 110 may alternatively determine that a different exercise, such as a bench press, was being performed.

In another non-limiting example, the head section 32 is in the horizontal position and the subject is performing a bench press exercise by pulling the exercise band 504 in an upward direction away from the subject's chest. Pulling the exercise band 504 in the upward or vertical direction orients the plate 516 in the second direction. The potentiometer 510 transmits this rotation direction data to the electronic control system 110, which determines that, based on the head section 32 being in the horizontal position and the exercise band 504 resulting in a force against the channel 512 substantially perpendicular to the direction of the head section 32, a bench press exercise is being performed. Without identifying the position of the head section 32 during this exercise, the electronic control system 110 may alternatively determine that a different exercise, such as a tricep and bicep lift exercise, was being performed.

In another non-limiting example, if the head section 32 is inclined to, for example, 90 degrees from the upper frame 16, i.e., in the vertical position, and the subject performs the same arm movement by pulling the exercise band 504 away from the subject's chest, the subject may perform a sitting press or pectoral fly exercise. In doing so, the plate 516 will be rotated to a third direction opposite the first direction and roughly perpendicular to the second direction due to the direction of the pulling force being directed in a direction parallel to the longitudinal axis of the person support apparatus 10 and toward the foot section 36 of the support surface 18. However, it is understood that the electronic control system 110 is configured to determine that, the exercise being performed when the exercise band 504 exerts a force on the channel 512 substantially perpendicular and away from the head section 32 a sitting press or pectoral fly exercise is being performed. It should be appreciated that, without identifying the head section 32 is inclined during this exercise, the electronic control system 110 may alternatively determine that a different exercise, such as a leg press, was being performed.

In some embodiments, the electronic control system 110 may be configured to continuously recognize changes in direction of the potentiometer 510 during an exercise. In doing so, the electronic control system 110 may determine that certain exercises, such as a rowing exercise, are being performed when the potentiometer 510 is rotated to more than one position during a single repetition.

In any event, the potentiometer 510 also transmits force data to the electronic control system 110. Thus, the identified exercise routine and the force data may be displayed on any of the user interfaces 50 to provide feedback to the subject. As a result, data on the exercise routines may be logged in the electronic control system 110. As noted above, this allows for progress of the subject to be tracked, which may be necessary for insurance reimbursement purposes.

In addition, in some embodiments, user input may be provided on the user interfaces 50 allowing the subject to confirm or deny the determination of the exercise routine by the electronic control system 110. For example, if the electronic control system 110 makes a determination that a curl exercise is being performed when in fact a bench press exercise is being performed, a user, such as the subject or the caregiver, may operate the user interfaces 50 to indicate the correct exercise routine. The electronic control system 110 then stores the data transmitted from the potentiometer 510 and the position of the support surface 18 as being associated with the exercise routine indicated by the user. Thus, the next time similar parameters are identified by the electronic control system 110, the correct exercise routine will be determined and displayed. The electronic control system 110 may use a machine learning algorithm to make more accurate determinations of the exercise routine being performed based on these confirmations or denials of the determined exercise routine by the user.

Although the person support apparatus 10 discussed herein is disclosed as including an attachment device 500 on each intermediate side rail 30, it is to be understood that the attachment devices 500 may be located in any suitable location on the person support apparatus 10. In some embodiments, the attachment devices 500 may be provided on each of the head side rails 24 to permit additional exercise routines to be performed. In other embodiments, the attachment devices 500 may be provided on the footboard 26 to permit leg exercises, such as knee bends, to be performed.

In addition, although not shown, it is to be understood that the attachment devices 500 may be detachable from the person support apparatus 10 and positionable on or within arms of a chair separate from the person support apparatus 10. As such, each attachment device 500 may be secured in any suitable manner, such as straps, clips, mechanical fasteners, or the like. Further, the attachment devices 500 may be provided on a movable frame member positionable on opposite sides of a bed without arms. In either instance, the attachment devices 500 communicate, either via a wired connection or wirelessly, with the electronic control system 110 to transmit the data in the same manner as discussed herein.

It should now be understood that the person support apparatuses described herein offer early mobility exercise to a subject that is bedridden. Specifically, the features discussed herein, such as the alternating inflatable bladders, sit up assist, leg raise/curl assist, in addition to the waist and knee straps, allow the subject to perform exercises necessary to adequately address muscle groups to those that are bedridden. By addressing these additional muscle groups the subject's chances of benefitting from early mobility therapies are greatly increased. This translates to lower morbidity rates for subjects confirmed by many early mobility studies. For care institutions, this concept translates to quicker recovery times for subjects and all the revenue benefits that are associated. The person support apparatus offers a safe and efficient solution to the hassles physical therapists face on a regular basis while trying to move highly acute subjects to other devices or areas of the hospitals. Because the person support apparatus offers mobility therapies incorporated into the subject platform, caregivers are more likely to use them. In addition, the availability of these exercises also allows the subject access to therapeutic exercises that can be done on his or her own. This could lead to a sense of empowerment allowing for better subject outcomes.

The advantages that arise from the software of the exercise devices are a unique way to track and display subject physical therapy data on a subject platform equipped with physical therapy capability. In addition, the ability of the software to capture, store, and then transmit the data to the subject's electronic medical record allows for a better awareness of the subject's progress. Furthermore, capturing the data and transmitting it to the electronic medical record can reduce charting errors and allow for more accurate subject charting. This ability in turn can lead to earlier interventions if the subject's progress is flat or even negative. Finally, the ability to better monitor the subject's physical therapy state may lead to better subject outcomes.

Embodiments can be described with reference to the following clauses, with preferred features laid out in the dependent clauses.

1. A person support apparatus comprising: a support surface having a patient facing surface and including a head section, a seat section, and a foot section, the head section and the foot section being rotatable with respect to the seat section; a head section actuator coupled between the head section and the seat section to rotate the head section with respect to the seat section; a foot section actuator coupled between the foot section and the seat section to rotate the foot section with respect to the seat section; at least one strain gauge provided proximate the patient facing surface of the support surface to detect a change in pressure against at least one of the head section and the foot section; and a controller configured to transmit a signal to one or more of the head section actuator or the foot section actuator to rotate a corresponding one of the head section or the foot section in response to receiving data from the at least one strain gauge indicating a change in pressure that exceeds a predetermined reduction in pressure.

2. The person support apparatus of clause 1, further comprising: a first strain gauge positioned at the head section of the support surface; and a user interface configured to receive a maximum angle and a minimum angle between which the head section rotates with respect to the seat section, and the predetermined reduction in pressure.

3. The person support apparatus of clause 2, wherein, in response to the change in pressure against the head section detected by the first strain gauge exceeds the predetermined reduction in pressure, the head section actuator rotates the head section in a first direction with respect to the seat section toward the maximum angle.

4. The person support apparatus of clause 3, wherein, in response to the head section reaching the maximum angle and the change in pressure against the head section detected by the first strain gauge exceeds the predetermined reduction in pressure, the head section actuator rotates the head section in an opposite second direction with respect to the seat section toward the minimum angle.

5. The person support apparatus of any of clauses 1-4, further comprising: a second strain gauge positioned at the foot section of the support surface; and a user interface configured to receive a maximum angle and a minimum angle at which the foot section rotates with respect to the seat section, the predetermined reduction in pressure, and a predetermined increase in pressure.

6. The person support apparatus of clause 5, wherein, in response to the change in pressure against the foot section detected by the second strain gauge exceeds the predetermined reduction in pressure, the foot section actuator rotates the foot section in a first direction with respect to the seat section toward the minimum angle.

7. The person support apparatus of clause 6, wherein, in response to the change in pressure against the foot section detected by the second strain gauge exceeds the predetermined increase in pressure, the foot section actuator rotates the foot section in an opposite second direction with respect to the seat section toward the maximum angle.

8. The person support apparatus of any of clauses 1-7, further comprising: a mattress supported on the subject facing surface of the support surface, the mattress including a pair of inflatable bladders inflatable in a direction opposite the subject facing surface of the support surface; and a user interface configured to receive at least one bladder operating parameter for each inflatable bladder of the pair of inflatable bladders, the at least one bladder operating parameter including at least one of a number of repetitions, an inflation height, a deflation height, a rate of inflation, and a time of inflation.

9. The person support apparatus of clause 8, wherein the pair of inflatable bladders are configured to inflate and deflate independent of one another as instructed by the at least one bladder operating parameter.

10. The person support apparatus of any of clauses 1-9, further comprising: a padded seat supported by the subject facing surface of the support surface; an exercise pad including a bottom surface formed from a low friction material, the padded seat removably coupled to the exercise pad; and a strap for securing a person to the padded seat.

11. The person support apparatus of clause 10, further comprising a restraint strap having a first end and a second end coupled to the support surface, wherein the restraint strap extends from opposite sides of the support surface.

12. A person support apparatus comprising: a base frame; an upper frame; a plurality of lift members extending between the base frame and the upper frame for moving the upper frame with respect to the base frame; a support surface having a patient facing surface and including a head section, a seat section, and a foot section, the head section and the foot section being rotatable with respect to the seat section; one or more actuators coupled between one or more of the head section and the seat section to rotate a corresponding one of the head section and the foot section with respect to the seat section; at least one strain gauge provided proximate the patient facing surface of the support surface to detect a change in pressure against at least one of the head section and the foot section; and a controller configured to transmit a signal to the one or more actuators to rotate a corresponding one of the head section and the foot section in response to receiving data from the at least one strain gauge indicating a change in pressure that exceeds a predetermined reduction in pressure.

13. The person support apparatus of clause 12, further comprising: a subject helper system comprising: a tube having a first end and an opposite second end, the first end of the tube coupled to the upper frame proximate the head section of the support surface; at least one belt having a first end and an opposite second end, the at least one belt movable through the tube in a first direction to extend out of the tube proximate the second end and an opposite second direction to retract back into the tube proximate the second end; a pair of handles provided at the second end of the at least one belt; and a tensioning assembly coupled to a first end of the at least one belt, the tensioning assembly being moveable toward the at least one belt to apply a pressure against the at least one belt.

14. The person support apparatus of clause 13, wherein the tensioning assembly further comprises: a biasing member having a first end fixed to the tube and a second end coupled to the first end of the at least one belt, the biasing member increasing tension on the at least one belt when moving in the first direction; and a shock having a first end fixed to the tube and a second end coupled to the first end of the at least one belt, the shock damping movement of the at least one belt when moving in the second direction.

15. The person support apparatus of clause 13 or clause 14, further comprising: a pair of belts, each belt including a corresponding one of the pair of handles provided at a second end of the pair of belts; a pair of tensioning assemblies, each of the pair of tensioning assemblies coupled to a corresponding one of the pair of belts for independently adding resistance to the pair of belts when moving in the first direction.

16. The person support apparatus of any of clauses 13-15, further comprising a friction mechanism comprising: a pad provided within the tube on a side of the at least one belt, the at least one belt extending between the pad and the tube, wherein: the pad is movable in a first direction toward the at least one belt to increase force by the pad against the at least one belt; and the pad is movable in a second direction away from the at least one belt to decrease force by the pad against the at least one belt.

17. The person support apparatus of any of clauses 12-16, further comprising a pair of attachment devices provided in opposite side rails of the upper frame, each of the pair of attachment devices comprising: a potentiometer; a shaft rotatably connected to the potentiometer; a plate fixed to an end of the shaft opposite the potentiometer; and a ring pivotally attached to the plate opposite the shaft for receiving an exercise band, wherein the potentiometer detects directional rotation and force when the shaft engages the potentiometer and the plate is pulled by the exercise band.

18. A method for performing exercises in a person support apparatus, the method comprising: receiving, at a user interface, a maximum angle of rotation and a predetermined reduction in pressure; monitoring, by a strain gauge, a change in pressure applied against a head section of the person support apparatus; and responsive to a change in pressure against the head section detected by the strain gauge exceeding the predetermined reduction in pressure, rotating the head section in a first direction with respect to a seat section of the person support apparatus toward the maximum angle of rotation.

19. The method of clause 18, further comprising: translating a pad in a first direction toward a belt to increase pressure against the belt extending between the pad and a tube; and translating the pad in a second direction away from the belt to decrease pressure against the belt.

20. The method of clause 18 or clause 19, further comprising: detecting, by a potentiometer provided in a side rail of the person support apparatus, a direction and a force of an exercise band being pulled by a subject; determining a position of the head section of the person support apparatus with respect to the seat section of the person support apparatus; determining an exercise routine being performed by the subject based on the direction in which the exercise band is being pulled and the position of the head section; and displaying the determined exercise routine on the user interface of the person support apparatus.

21. A person support apparatus comprising: a base frame; an upper frame having a lower edge, a support caster mounted to the lower edge; a support surface including a head section, a seat section, and a foot section, the head section and the seat section being pivotable with respect to the seat section; and a plurality of lift members for moving the upper frame with respect to the base frame.

22. The person support apparatus of clause 21 further comprising: a strain gauge positioned within or on the head section; and a user interface for inputting a maximum angle and a minimum angle at which the head section rotates with respect to the seat section, and a predetermined threshold.

23. The person support apparatus of clause 22, wherein the strain gauge monitors a force and wherein the head section rotates in a first direction with respect to the seat section to the maximum angle when the force is less than the predetermined threshold.

24. The person support apparatus of clause 22, wherein the strain gauge monitors a force and wherein the head section rotates in a second direction with respect to the seat section to the minimum angle when the force is less than the predetermined threshold.

25. The person support apparatus of clause 21 further comprising: a strain gauge positioned within the foot section; and a user interface for inputting a maximum angle and a minimum angle at which the foot section rotates with respect to the seat section, a first predetermined threshold, and a second predetermined threshold.

26. The person support apparatus of clause 25, wherein the strain gauge monitors a force and wherein the foot section rotates in a first direction with respect to the seat section to the maximum angle when the force is less than the first predetermined threshold.

27. The person support apparatus of clause 25 or clause 26, wherein the strain gauge monitors a force and wherein the foot section rotates in a second direction with respect to the seat section to the minimum angle when the force is greater than the second predetermined threshold.

28. The person support apparatus of any of clauses 21-27 further comprising: at least one inflatable bladder; and a user interface for inputting at least one bladder operation parameter, the bladder operation parameter selected from the group consisting of number of repetitions, inflation height, deflation height, rate of inflation, and time of inflation.

29. The person support apparatus of clause 28, wherein the at least one inflatable bladder extends transverse to a longitudinal axis of the support surface.

30. The person support apparatus of any of clauses 28-29, wherein the at least one inflatable bladder comprises a first inflatable bladder and a second inflatable bladder.

31. The person support apparatus of clause 30, wherein the first inflatable bladder and the second inflatable bladder are operable independent of one another.

32. The person support apparatus of any of clauses 30-31, wherein the first inflatable bladder and the second inflatable bladder alternatively inflate and deflate in opposition of one another.

33. The person support apparatus of clause 21 further comprising: a knee strap having a first end and a second end, the knee strap permitting a person to perform shallow knee bend exercises, the knee strap having an adjustable length, the first and second ends of the knee strap are attachable to the support surface.

34. The person support apparatus of clause 33, wherein the knee strap is formed from an inelastic material.

35. The person support apparatus of any of clause 34 further comprising: a padded seat; an exercise pad including a bottom surface formed from a low friction material, the padded seat removably coupled to the exercise pad; and a strap for securing a person to the padded seat.

36. The person support apparatus of any of clauses 21-35 further comprising: a waist strap having a first end and a second end, the waist strap formed from an inelastic material and securing a waist of a person against the support surface, the waist strap having an adjustable length, the first and second ends of the waist strap are attachable to the support surface.

37. The person support apparatus of any of clauses 21-36 further comprising a tube fixed to the base frame and a belt assembly extending through the tube, the belt assembly including a pair of belts having a first end and a second end, the first end of the belts coupled to a biasing member and a shock, the second end of the belts attached to a respective handle, the belt assembly further including a friction mechanism for adjusting tension on the belts.

38. The person support apparatus of any of clauses 21-37 further comprising a pair of attachment devices provided in opposite sides of the upper frame, each pair of attachment devices including a potentiometer, a shaft rotatably connected to the potentiometer, a plate fixed to the shaft, and a ring for receiving an exercise band, the potentiometer identifying directional rotation and force based on movement of the ring.

39. A method for performing sit up exercises in a person support apparatus comprising the steps of: receiving, at a user interface, a maximum angle of rotation, a minimum angle of rotation, and a predetermined threshold; monitoring a force against a head section; rotating the head section in a first direction with respect to a seat section of the person support apparatus to the maximum angle of rotation when the force against the head section is less than the predetermined threshold; and rotating the head section in a second direction with respect to the seat section to the minimum angle of rotation when the force against the head section is less than the predetermined threshold.

40. A method of performing leg raise and leg curl exercises in a person support apparatus comprising the steps of: receiving at a user interface a maximum angle, a minimum angle, a first predetermined threshold, and a second predetermined threshold; monitoring a force against a foot section; rotating the foot section in a first direction with respect to a seat section of the person support apparatus to the maximum angle of rotation when the force against the head section is less than the first predetermined threshold; and rotating the head section in a second direction with respect to the seat section to the minimum angle of rotation when the force against the foot section is greater than the second predetermined threshold.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as “a,” “an,” “at least one,” “at least a portion” are used there is no intention to limit the claim to only one item unless specifically stated to the contrary in the claim. When the language “at least a portion” and/or “a portion” is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and many combinations of aspects and principles are possible in light of the various embodiments provided above.

What is claimed is:

1. A person support apparatus comprising:

a support surface having a patient facing surface and including a head section, a seat section, and a foot section, the head section and the foot section being rotatable with respect to the seat section;

a head section actuator coupled between the head section and the seat section to rotate the head section with respect to the seat section;

a foot section actuator coupled between the foot section and the seat section to rotate the foot section with respect to the seat section;

at least one strain gauge provided proximate the patient facing surface of the support surface to detect a change in pressure against at least one of the head section and the foot section, the at least one strain gauge including a first strain gauge positioned at the head section of the support surface;

a controller configured to transmit a signal to one or more of the head section actuator or the foot section actuator to rotate a corresponding one of the head section or the foot section in response to receiving data from the at least one strain gauge indicating a change in pressure that exceeds a predetermined reduction in pressure; and a user interface configured to receive a maximum angle and a minimum angle between which the head section rotates with respect to the seat section, and the predetermined reduction in pressure, wherein, in response to the change in pressure against the head section detected by the first strain gauge exceeding the predetermined reduction in pressure, the head section actuator rotates the head section in a first direction with respect to the seat section toward the maximum angle, wherein, in response to the head section reaching the maximum angle and the change in pressure against the head section detected by the first strain gauge exceeds the predetermined reduction in pressure, the head section actuator rotates the head section in an opposite second direction with respect to the seat section toward the minimum angle.

2. The person support apparatus of claim 1, further comprising:

a second strain gauge of the at least one strain gauge positioned at the foot section of the support surface, wherein the user interface is further configured to receive a maximum angle and a minimum angle at which the foot section rotates with respect to the seat section, and a predetermined increase in pressure.

3. The person support apparatus of claim 2, wherein, in response to the change in pressure against the foot section detected by the second strain gauge exceeding the predetermined reduction in pressure, the foot section actuator rotates the foot section in a first direction with respect to the seat section toward the minimum angle.

4. The person support apparatus of claim 3, wherein, in response to the change in pressure against the foot section detected by the second strain gauge exceeding the predetermined increase in pressure, the foot section actuator rotates the foot section in an opposite second direction with respect to the seat section toward the maximum angle.

5. The person support apparatus of claim 1, further comprising:

a mattress supported on the subject facing surface of the support surface, the mattress including a pair of inflatable bladders inflatable in a direction opposite the subject facing surface of the support surface, wherein the user interface is further configured to receive at least one bladder operating parameter for each inflatable bladder of the pair of inflatable bladders, the at least one bladder operating parameter including at least one of a number of repetitions, an inflation height, a deflation height, a rate of inflation, and a time of inflation.

6. The person support apparatus of claim 5, wherein the pair of inflatable bladders are configured to inflate and deflate independent of one another as instructed by the at least one bladder operating parameter.

7. The person support apparatus of claim 1, further comprising:

a padded seat supported by the subject facing surface of the support surface;

an exercise pad including a bottom surface formed from a low friction material, the padded seat removably coupled to the exercise pad; and a restraint strap for securing a person to the padded seat.

8. The person support apparatus of claim 7, wherein the restraint strap has a first end and a second end coupled to the support surface, wherein the restraint strap extends from opposite sides of the support surface.

9. A person support apparatus comprising:

a support surface having a subject facing surface and including a head section and a seat section, the head section being rotatable with respect to the seat section;

a head section actuator coupled between the head section and the seat section to rotate the head section with respect to the seat section;

a strain gauge provided proximate the subject facing surface and at the head section of the support surface to detect a change in pressure against the head section;

a controller configured to transmit a signal to the head section actuator to rotate the head section in response to receiving data from the strain gauge indicating a change in pressure that exceeds a predetermined reduction in pressure; and a user interface configured to receive a maximum angle and a minimum angle between which the head section rotates with respect to the seat section, and the predetermined reduction in pressure, wherein, in response to the head section reaching the maximum angle and the change in pressure against the head section detected by the strain gauge exceeding the predetermined reduction in pressure, the head section actuator rotates the head section with respect to the seat section toward the minimum angle.

10. A person support apparatus comprising:

a support surface having a subject facing surface and including a foot section and a seat section, the foot section being rotatable with respect to the seat section;

a foot section actuator coupled between the foot section and the seat section to rotate the foot section with respect to the seat section;

a strain gauge provided proximate the subject facing surface and at the foot section of the support surface to detect a change in pressure against the foot section;

a controller configured to transmit a signal to the foot section actuator to rotate the foot section in response to receiving data from the strain gauge indicting a change in pressure that exceeds a predetermined reduction in pressure; and a user interface configured to receive maximum angle and a minimum angle between which the foot section rotates with respect to the seat section, and the predetermined reduction in pressure, wherein, in response to the foot section reaching the maximum angle and the change in pressure against the foot section detected by the strain gauge exceeding the predetermined reduction in pressure, the foot section actuator rotates the foot section with respect to the seat section toward the minimum angle.

* * * * *